(12) United States Patent
Guzzo et al.

(10) Patent No.: US 9,134,497 B2
(45) Date of Patent: Sep. 15, 2015

(54) FIBER OPTIC CABLE MANAGEMENT MODULE AND PANEL

(75) Inventors: Lou Guzzo, Inman, SC (US); Ted Lichoulas, Simpsonville, SC (US); Chris Donaldson, Greenville, SC (US); Chuck Turner, Greenville, SC (US); Run Ron, Duncan, SC (US); Matthew Johnston, Greenville, SC (US); Eddie Kimbrell, Dacula, GA (US)

(73) Assignee: AFL Telecommunications LLC, Spartanburg, SC (US)

( * ) Notice: Subject to any disclaimer, the term of this patent is extended or adjusted under 35 U.S.C. 154(b) by 519 days.

(21) Appl. No.: 13/381,578

(22) PCT Filed: May 13, 2011

(86) PCT No.: PCT/US2011/036408
§ 371 (c)(1),
(2), (4) Date: Dec. 29, 2011

(87) PCT Pub. No.: WO2011/143537
PCT Pub. Date: Nov. 17, 2011

(65) Prior Publication Data
US 2012/0114295 A1 May 10, 2012

Related U.S. Application Data

(60) Provisional application No. 61/334,645, filed on May 14, 2010, provisional application No. 61/346,984, filed on May 21, 2010, provisional application No. 61/362,954, filed on Jul. 9, 2010, provisional (Continued)

(51) Int. Cl.
*G02B 6/00* (2006.01)
*G02B 6/44* (2006.01)

(Continued)

(52) U.S. Cl.
CPC ............ *G02B 6/4452* (2013.01); *G02B 6/4453* (2013.01); *H04Q 1/021* (2013.01); *H04Q 1/066* (2013.01)

(58) Field of Classification Search
CPC .. G02B 6/4452; G02B 6/4453; G02B 6/4455; G02B 6/3897; G02B 6/02342
USPC .......................................... 385/135; 220/241
See application file for complete search history.

(56) References Cited

U.S. PATENT DOCUMENTS

| 4,944,568 A * | 7/1990 | Danbach et al. ................. 385/88 |
| 2005/0111809 A1 * | 5/2005 | Giraud et al. ................. 385/135 |

(Continued)

OTHER PUBLICATIONS

International Search Report in PCT/US2011/036408, dated Aug. 19, 2011.

*Primary Examiner* — Peter Radkowski
(74) *Attorney, Agent, or Firm* — Sughrue Mion, PLLC

(57) ABSTRACT

An optical module is provided. The optical module includes a base module and a cable management bracket removably attached to the base module. The base module includes a first adapter configured to interface with a first cable. The base module further includes a plurality of second adapters configured to interface with a plurality of optical fibers and a plurality of second cables. The cable management bracket includes a plurality of cable routing slots for routing the plurality of second cables. A fiber optic panel is also provided. The fiber optic panel includes a base, a plurality of module guides removably attached to the base, and a plurality of the optical modules slid between the module guides. A fiber management system is further provided. The fiber management system includes a rack and the fiber optic panel mounted on the rack.

16 Claims, 35 Drawing Sheets

Related U.S. Application Data application No. 61/372,498, filed on Aug. 11, 2010, provisional application No. 61/380,847, filed on Sep. 8, 2010, provisional application No. 61/390,243, filed on Oct. 6, 2010.

(51) Int. Cl.
*H04Q 1/02* (2006.01)
*H04Q 1/06* (2006.01)

(56) References Cited

U.S. PATENT DOCUMENTS

| | | | |
|---|---|---|---|
| 2008/0080825 A1* | 4/2008 | Leon et al. | 385/135 |
| 2009/0067800 A1* | 3/2009 | Vazquez et al. | 385/135 |
| 2010/0054681 A1* | 3/2010 | Biribuze et al. | 385/135 |
| 2010/0054684 A1* | 3/2010 | Cooke et al. | 385/135 |
| 2010/0054685 A1* | 3/2010 | Cooke et al. | 385/135 |
| 2011/0222819 A1* | 9/2011 | Anderson et al. | 385/78 |

* cited by examiner

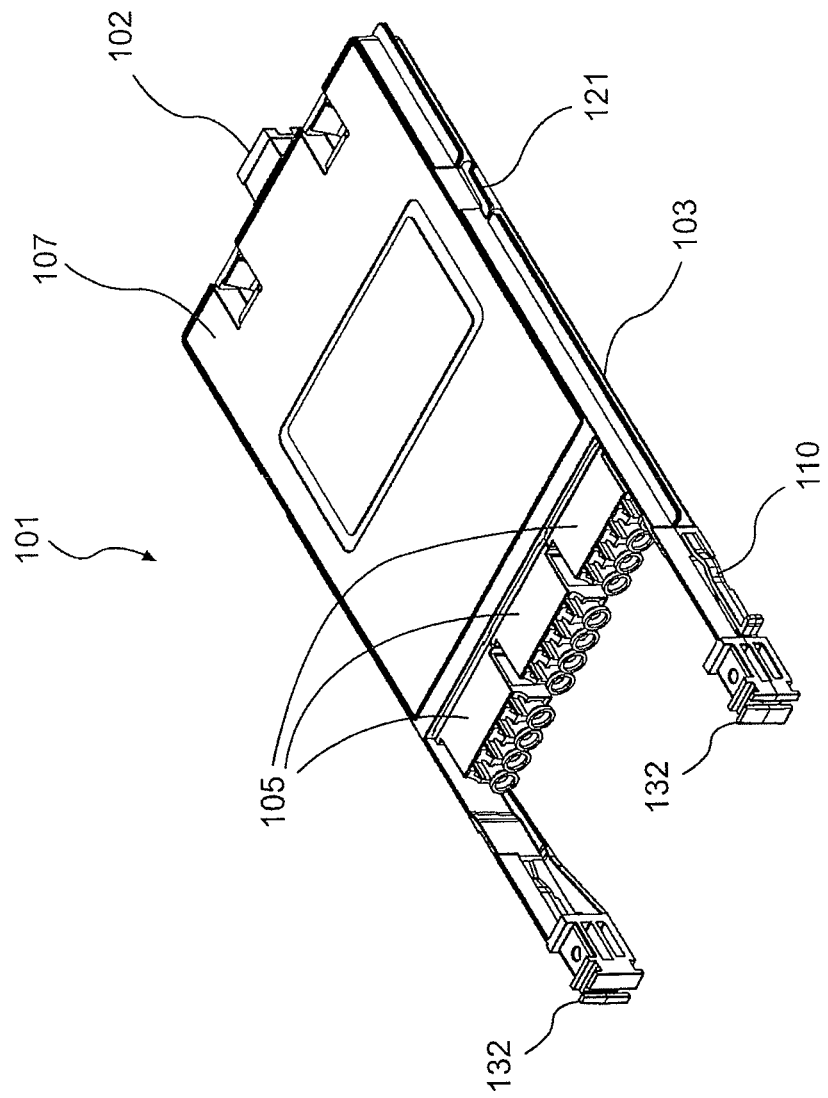

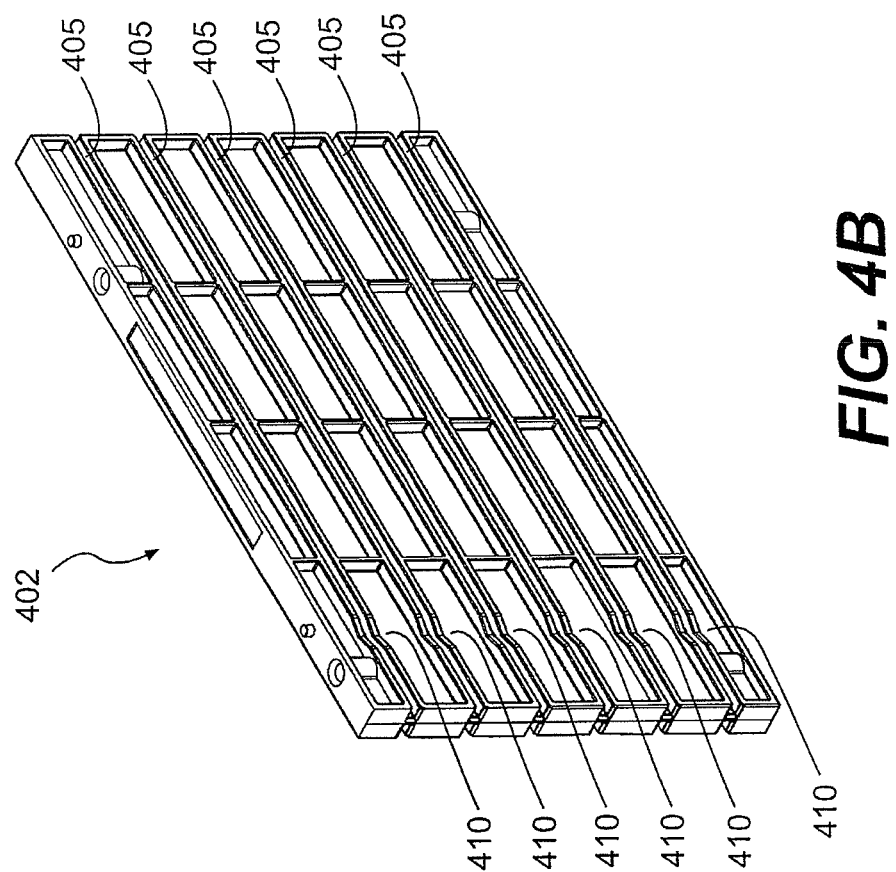

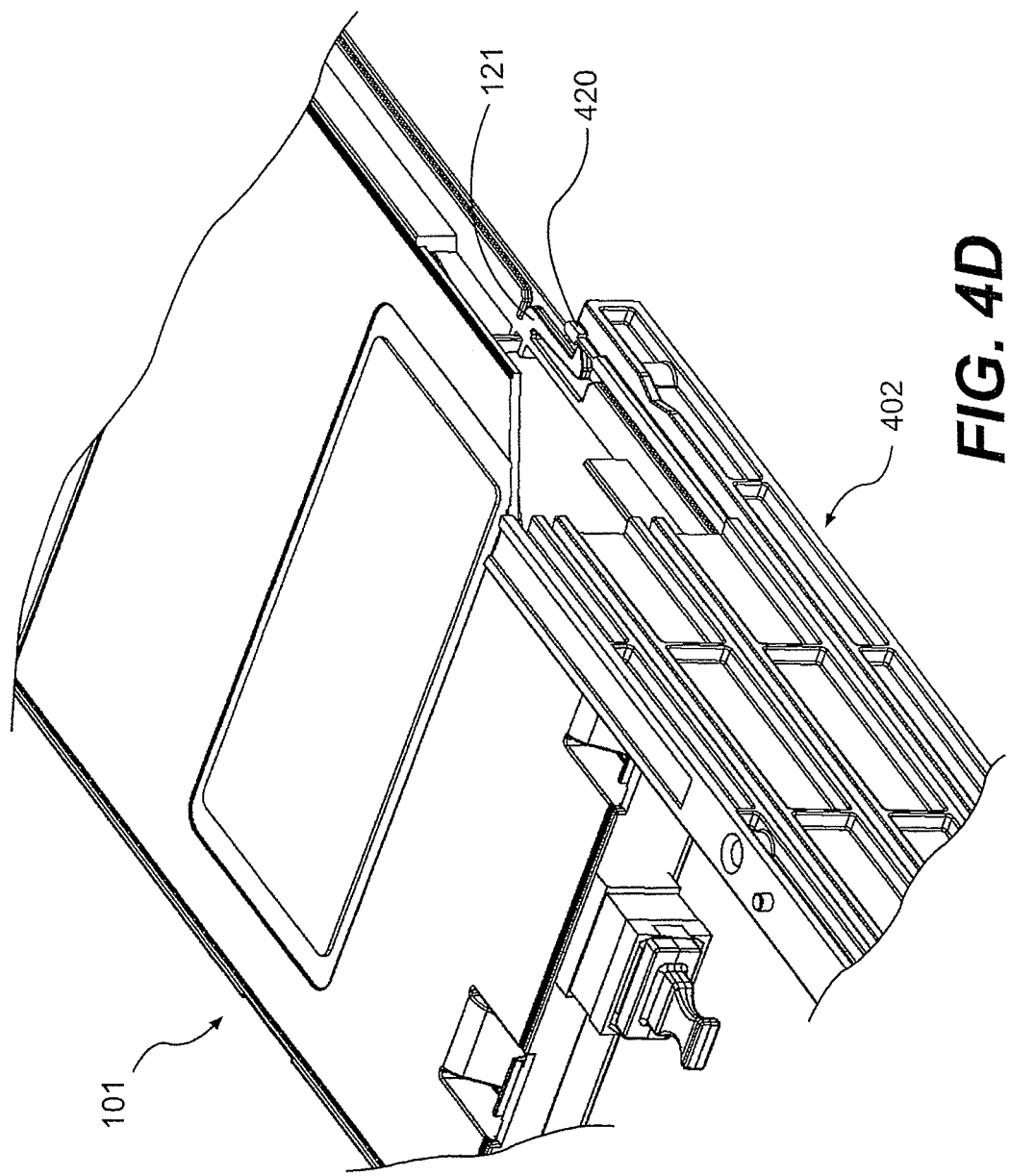

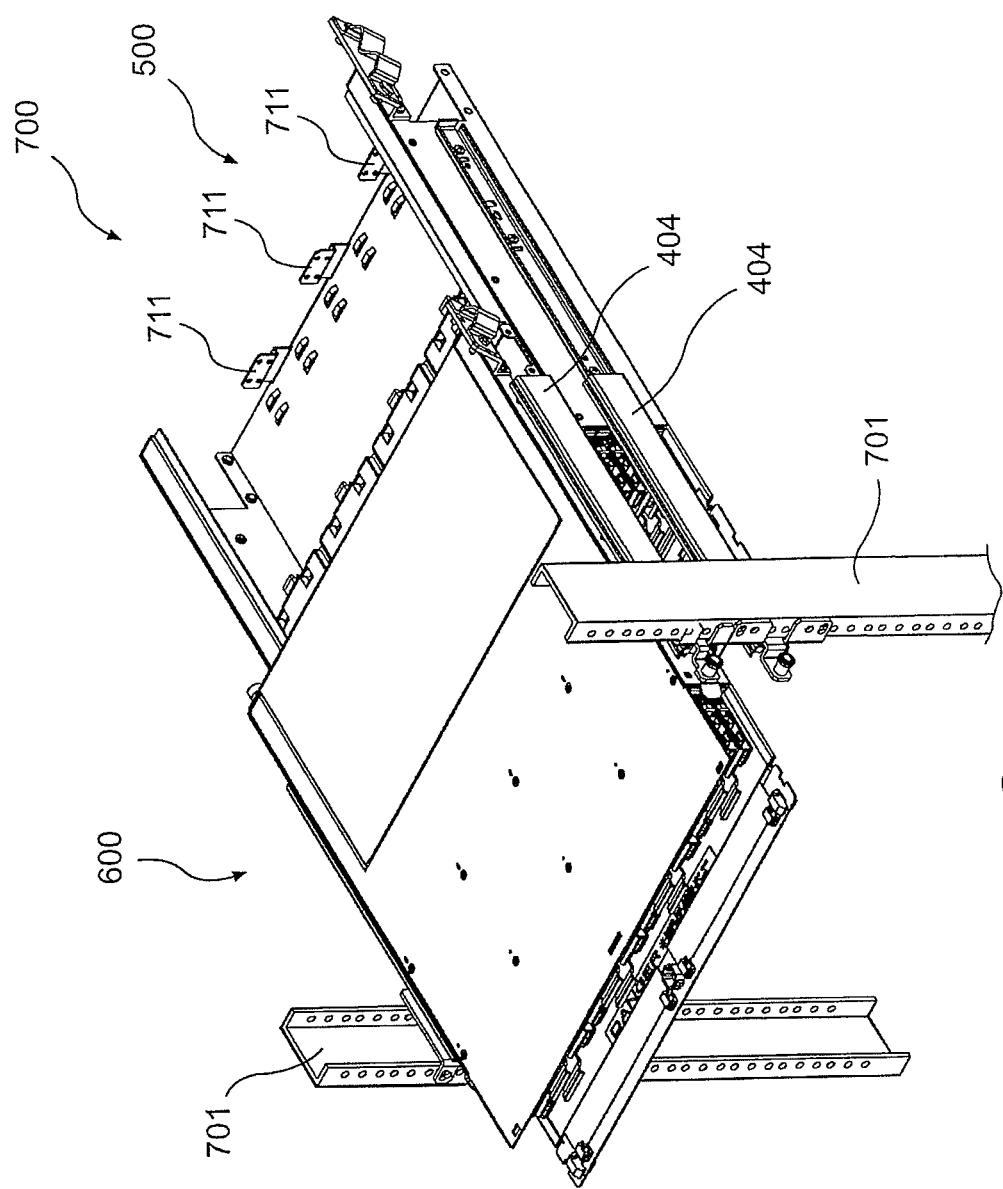

FIBER OPTIC CABLE MANAGEMENT MODULE AND PANEL

CROSS-REFERENCE TO RELATED PATENT APPLICATIONS

The present application claims priority from U.S. Provisional Application No. 61/334,645, filed on May 14, 2010, U.S. Provisional Application No. 61/346,984, filed on May 21, 2010, U.S. Provisional Application No. 61/362,954, filed on Jul. 9, 2010, U.S. Provisional Application No. 61/372,498, filed on Aug. 11, 2010, U.S. Provisional Application No. 61/380,847, filed on Sep. 8, 2010, and U.S. Provisional Application No. 61/390,243, filed on Oct. 6, 2010, the disclosures of which are incorporated herein by reference in their entireties.

BACKGROUND

1. Field of the Invention

Apparatuses consistent with the present invention relate to ultra-high density panels and modules. More particularly, these apparatuses relate to ultra-high density panels and modules for fiber optic cable management.

2. Description of the Related Art

With the growing need for bandwidth, public and private network equipment spaces (Telco Central Offices, CATV Head ends, and Data Centers) have become increasingly more congested, necessitating efficient, compact fiber optic fiber management solutions. High density fiber optic panel solutions have been created to address this market need. These solutions, however, do not have efficient method of managing the fiber optics jumpers or patchcords that interface with these high density fiber optic panels. Specifically, due to the inefficient fiber management methods designed into these high density panels, it is difficult for technicians in these public and private network equipment spaces to replace fiber optic jumpers, change where fiber optic jumpers are installed, and replace fiber optic modules in these high density panels without mechanically disrupting the numerous fiber optic jumpers feeding these panels. If these fiber optic jumpers are inadvertently bent, signal path attenuation will increase, resulting in data transmission degradation.

Therefore, there is a need for a system which allows for efficient fiber optic cable management.

Some related art patent publications have attempted to address the need for a high-density fiber management system. For example, U.S. patent publications US 2010/0322579 A1, US 2010/0322580 A1, US 2010/0322581 A1, US 2010/0322582 A1, and US 2010/0322583 A1 disclose high-density fiber optic modules and fiber optic module housings for accommodating a large number of fiber optic connections in a limited space.

However, the designs described in these publication are not very flexible and cannot accommodate many concerns or requirements of technicians using these high-density modules and housings.

SUMMARY

Exemplary embodiments of the present invention address at least the above problems and/or disadvantages and other disadvantages not described above. Also, the present invention is not required to overcome the disadvantages described above, and an exemplary embodiment of the present invention may not overcome any of the problems listed above.

According to an exemplary embodiment, an optical module is provided. The optical module includes a base module and a cable management bracket removably attached to the base module. The base module includes a first adapter configured to interface with a first cable. The base module further includes a plurality of second adapters configured to interface with a plurality of optical fibers and a plurality of second cables. The cable management bracket includes a plurality of cable routing slots for routing the plurality of second cables.

According to another exemplary embodiment a fiber optic panel is provided. The fiber optic panel includes a base, a plurality of module guides removably attached to the base, and a plurality of the optical modules slid between the module guides.

According to another exemplary embodiment, a fiber management system is provided. The fiber management system includes a rack and the fiber optic panel mounted on the rack.

BRIEF DESCRIPTION OF THE DRAWINGS

The above and/or other aspects of the present invention will be made more apparent by describing certain exemplary embodiments of the present invention with reference to the accompanying drawings, in which:

FIG. 2A illustrates an exemplary base module.

FIGS. 4B and 4C illustrate exemplary module guides to be placed on the base of the fiber optic panel.

FIG. 4D illustrates a stop feature provided on the base module.

FIG. 7C illustrates the fiber management system of FIG. 7B with the rear L-door of one of the panels taken off.

DETAILED DESCRIPTION

Figure 1A:
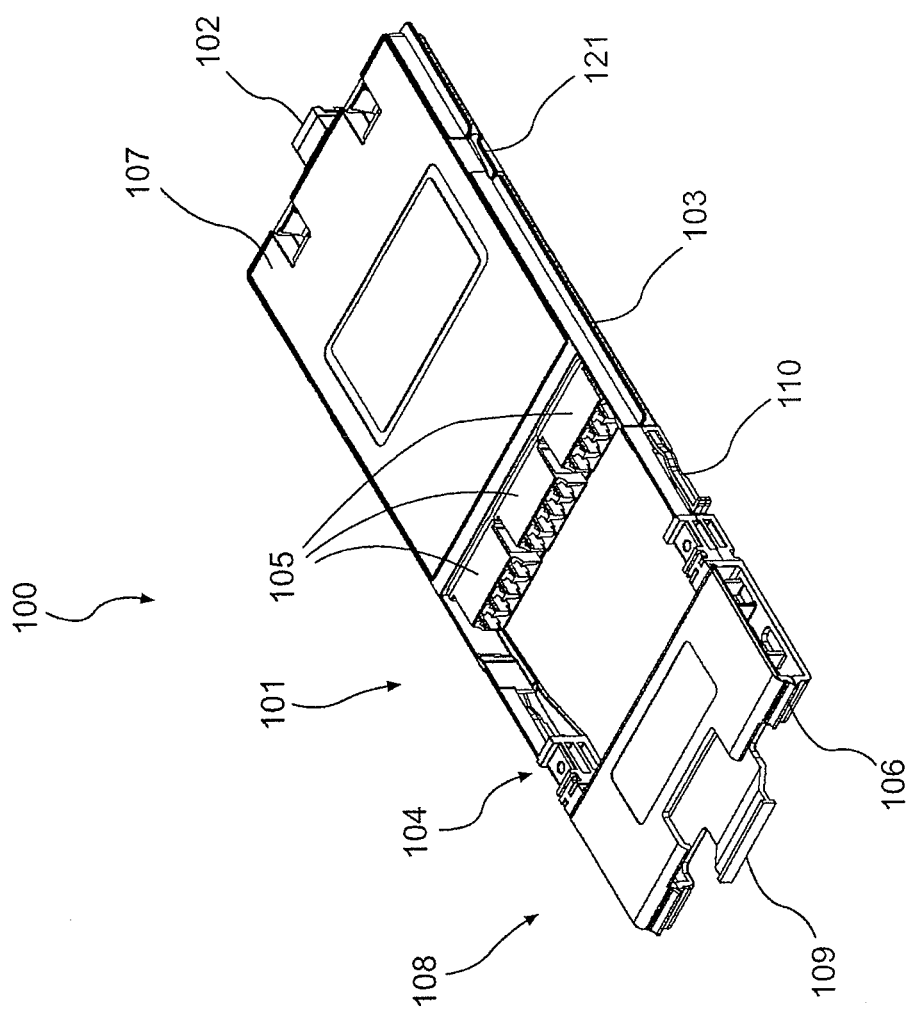
FIG. 1A illustrates an exemplary embodiment of an optical module including a base module and an optical module.

Certain exemplary embodiments of the present invention will now be described in greater detail with reference to the accompanying drawings.

In the following description, like drawing reference numerals are used for like elements, even in different drawings. The matters defined in the description, such as detailed construction and elements, are provided to assist in a comprehensive understanding of the invention. However, the present invention can be practiced without those specifically defined matters. Also, well-known functions or constructions are not described in detail since they would obscure the invention with unnecessary detail.

Figure 1B:
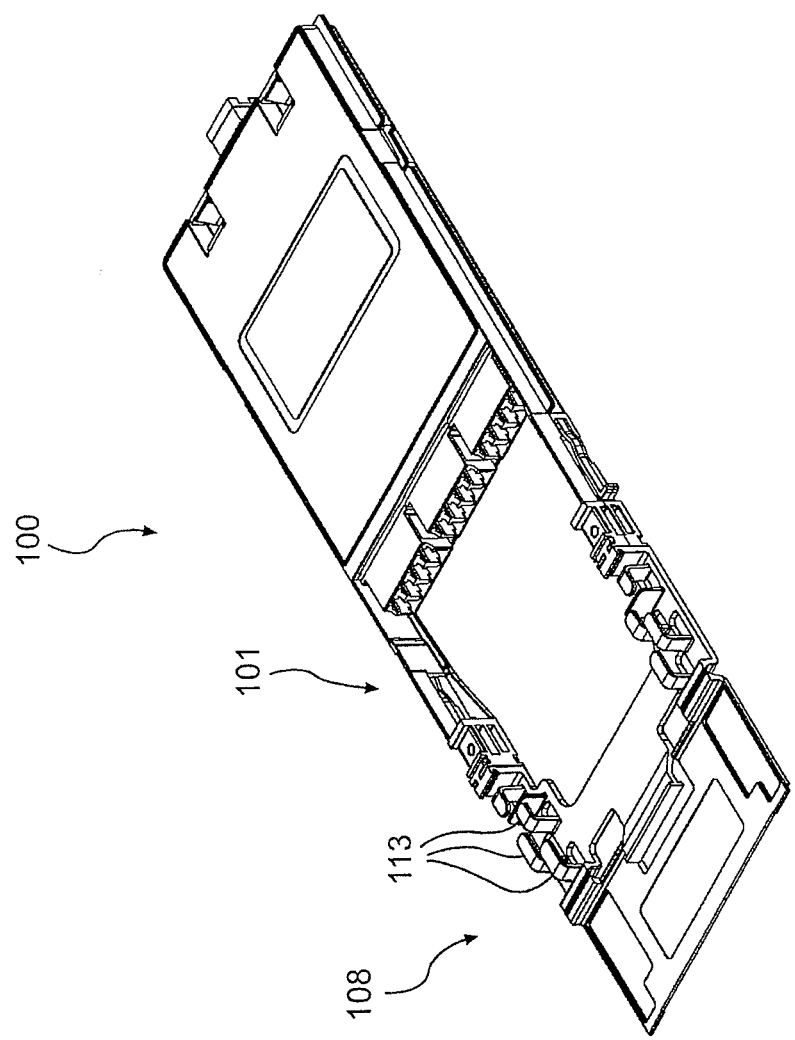
FIG. 1B illustrates the optical module of FIG. 1A with the cable management bracket in an open position.

According to an exemplary embodiment, an optical module 100 is described with reference to FIGS. 1A, 1B, and 1C. FIG. 1A illustrates a single height/single width 12 LC optical module 100 including a cable management bracket 108 in a closed position and a base module 101. FIG. 1B illustrates the optical module 100 with the cable management bracket 108 in an open position. The base module 101 is described later in more detail with reference to FIGS. 2A, 2B, and 2C.

Figure 1C:
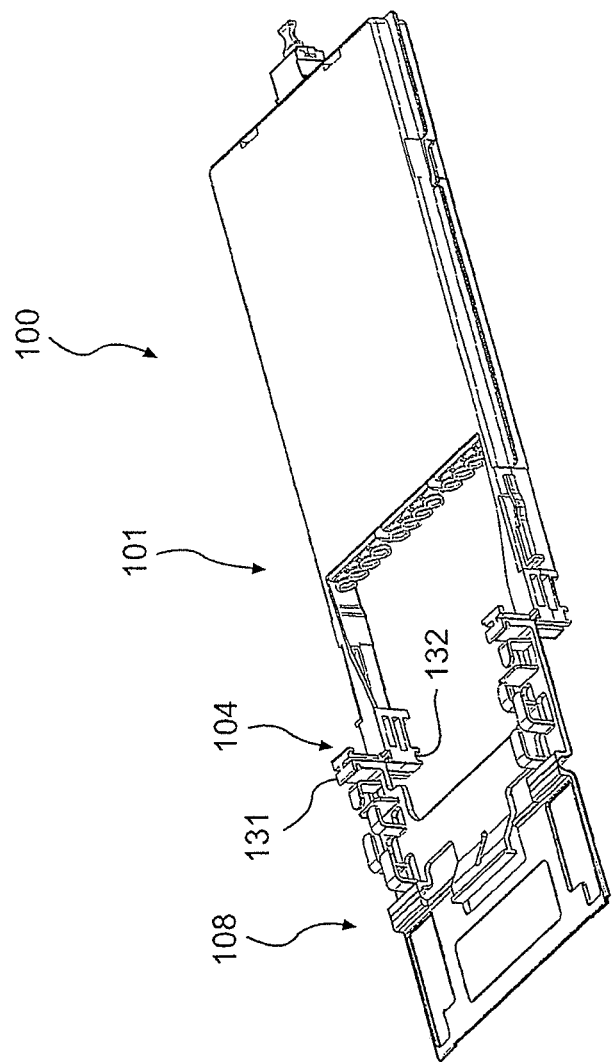
FIG. 1C illustrates the mounting of the cable management bracket to the base module with the base module flipped 180 degrees with respect to FIG. 1A.
Figure 2B:
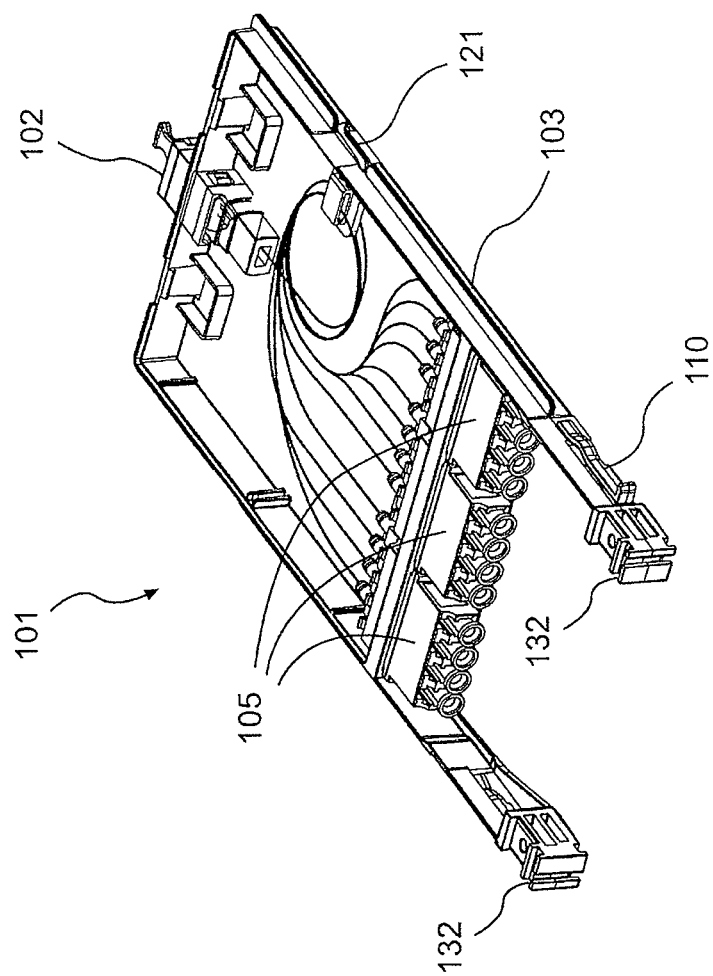
FIG. 2B illustrates the base module without its module cover.

As shown in FIGS. 1A, 1B, and 1C, the cable management bracket 108 is removably mounted to the base module 101 using a locking mechanism 104 in which a bi-directional key 131 on the cable management bracket 108 is inserted into a slot 132 on the base module 101. This feature allows an installer to change the orientation of the cable management bracket so that it opens up or opens down relative to the module cover 107 of the base module 101. This feature is important so that the fiber interface assembly can be flipped over in a panel to support industry standard MTP wiring standards and allow for efficient cable management with the cable management bracket closed.

In an alternative exemplary embodiment, plastic rivets may be used to mount the cable management bracket 108 to the base module 101 instead of the locking mechanism 104. The base module 101 may include mounting holes (not shown) through which rivets may pass through to mount the cable management bracket.

The base module 101 includes a plurality of quad LC adapters 105, which are used to couple individual fibers to their respective cables. FIG. 1A illustrates three Quad LC adapters. An SC-cutout MTP adapter 102 is also shown in FIG. 1A. The MTP adapter 102 may be replaced with a Simplex SC adapter or a Duplex SC-cutout LC adapter or a Cover when no adapter is used. These adapters may serve as both inputs and outputs. The base module 101 is also provided with rails 103 on two sides thereof.

FIG. 1C illustrates the cable management bracket 108 being mounted to the base module 101 by inserting the keys 131 into the slot 132.

The base module 101 is now explained in more detail with reference to FIGS. 2A, 2B, 2C, and 2D. A first exemplary embodiment of the base module 101 is described in FIG. 2A. The base module 101 is used to provide a one-to-many or many-to-one connection for a fiber optic cable. For example, in FIG. 2B, a single cable (not shown) is attached to the MT adapter 102 and the cable output is split into 12 fibers that are connected to 12 LC adapters 105. A cover 107 is provided to prevent dust from entering the enclosure where the cable is split into constituent fibers.

Figure 2C:
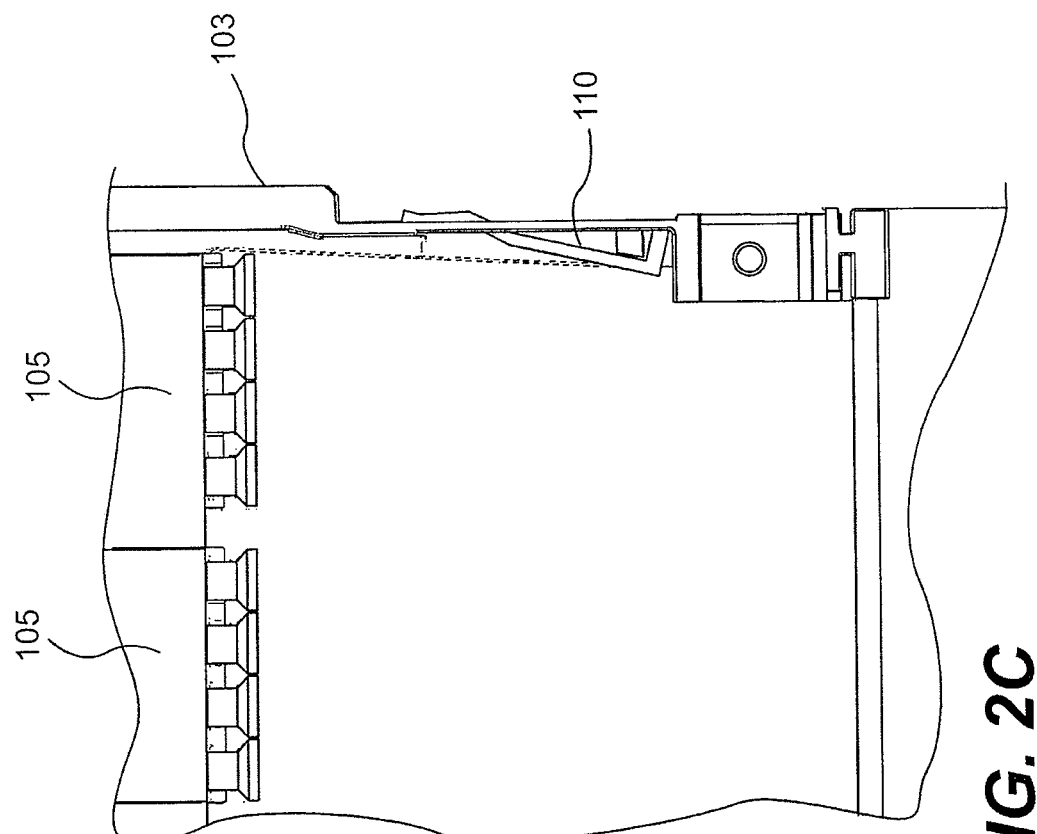
FIG. 2C illustrates a partial top view of the base module.
Figure 2D:
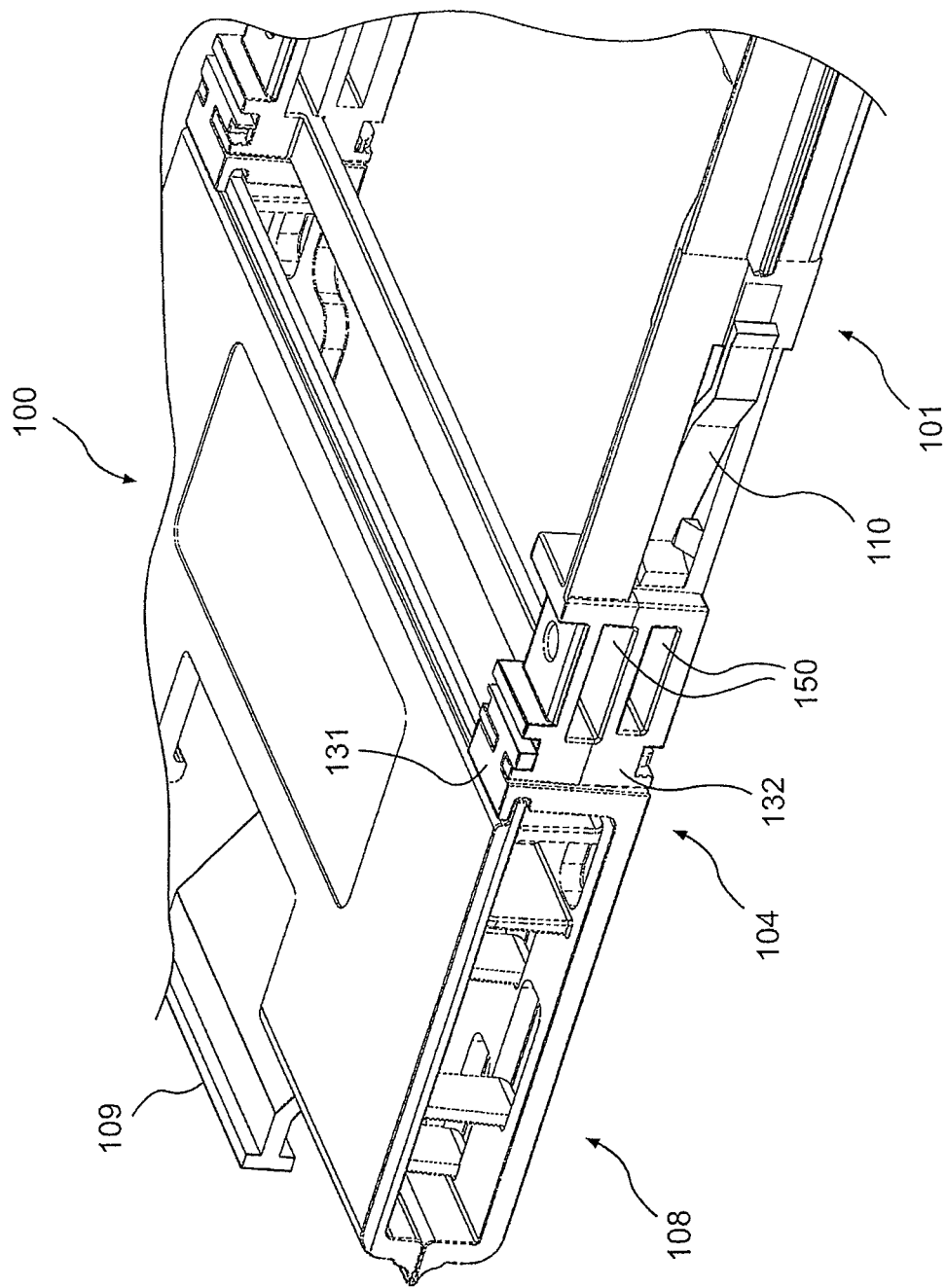
FIG. 2D illustrates an exploded view of a portion of the base module.
Figure 4A:
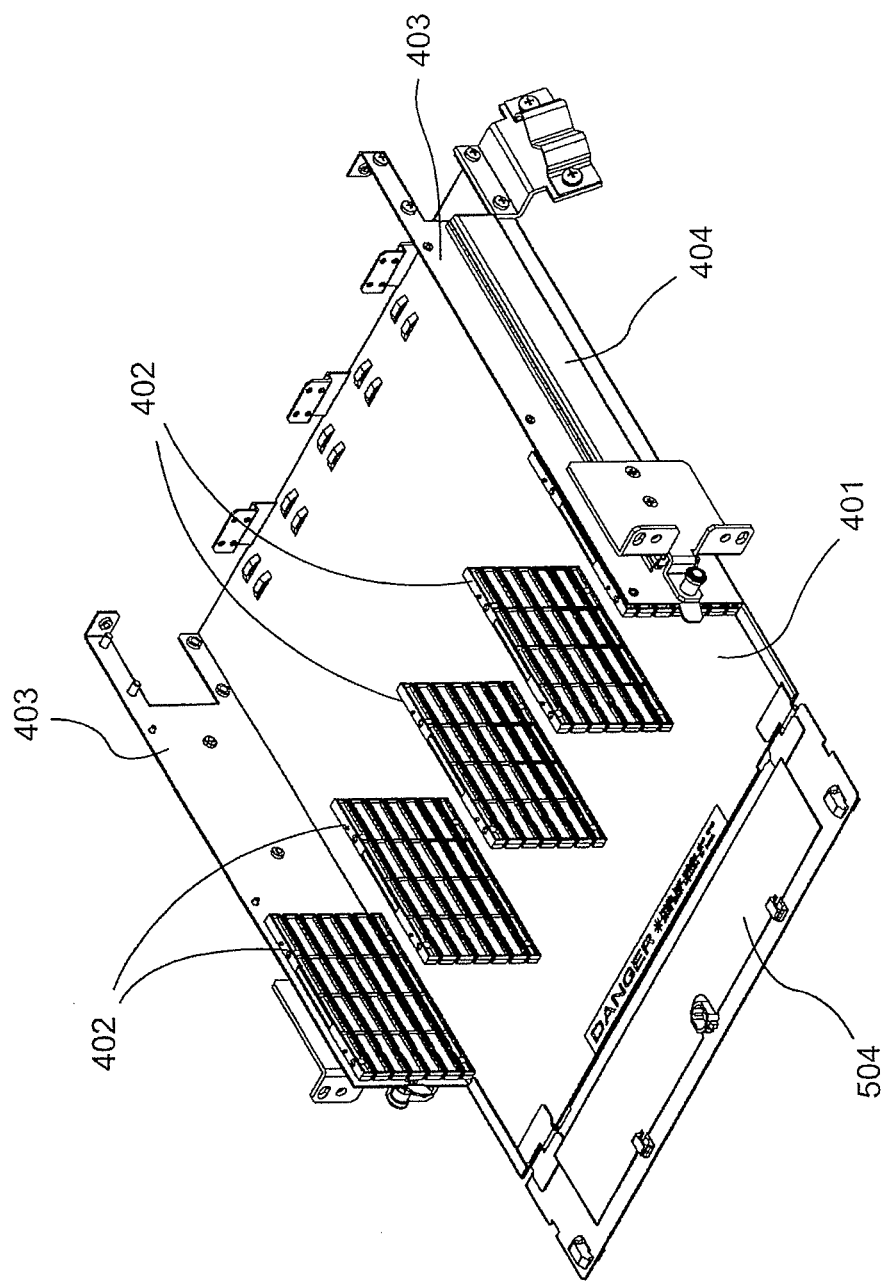
FIG. 4A describes the basic parts for creating a fiber optic panel.

The base module 101 also includes a location guide or travel limiter 110 on at least one side of the base module 101. The travel limiter 110 may be provided on both sides of the base module 101. The travel limiter 110 includes a male V-section and a tab, which is an L-shaped section. FIG. 2C describes a top-view of the base module 101 with the travel limiter 110 in a stowed position in which the travel limiter tab is pushed inside the base module 101 to thereby disable the travel limiter 101. FIG. 2D provides a closer look at the travel limiter 110 in its stowed position. The travel limiter 110 serves as a location guide when inserting the base module 101. The function of the travel limiter 110 will become clear when FIGS. 4A and 4B are described.

Further, a stop 121 is also provided on at least one side of the base module 101. Again, the function of the stop 121 will become clear when FIGS. 4A and 4B are described.

A typical application for the base module 101 (12 LC module) is a 1×N splitter module or CWDM/DWDM Modules. For example, the ports of a 12LC module can be configured as a 8 channel CWDM and DWDM module as follows: common port; test port 1, test port 2, upgrade port, channel 1 port, channel 2 port, channel 3 port, channel 4 port, channel 5 port, channel 6 port, channel 7 port, and channel 8 port.

Figure 2E:
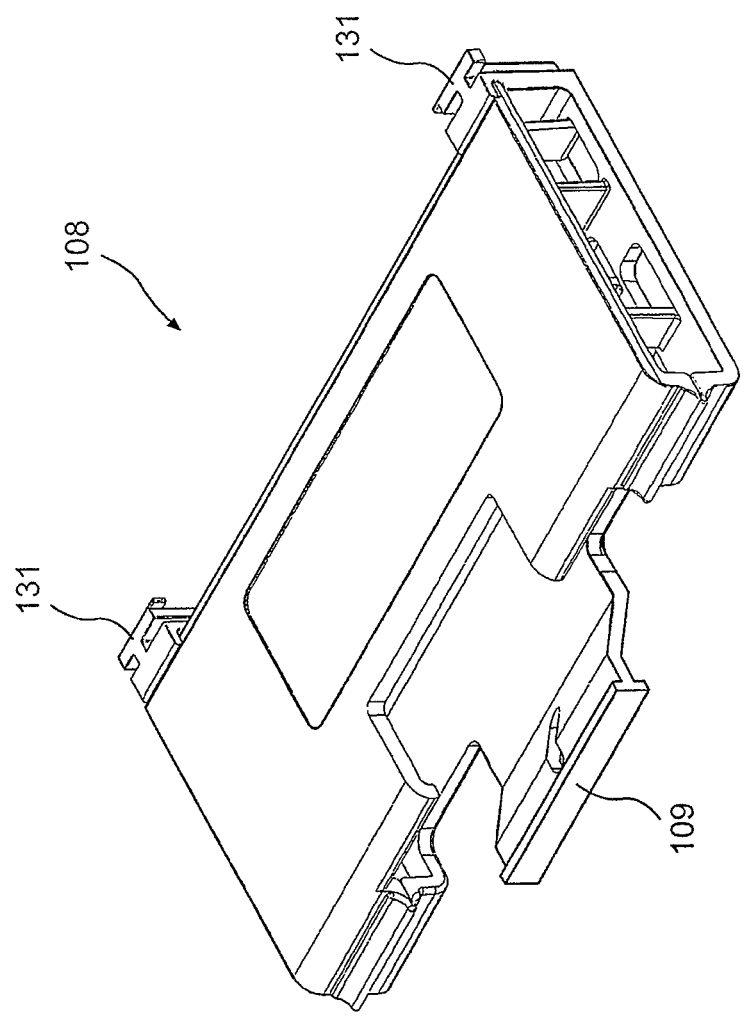
FIGS. 2E and 2F describe an exemplary embodiment of the cable management bracket.
Figure 2F:
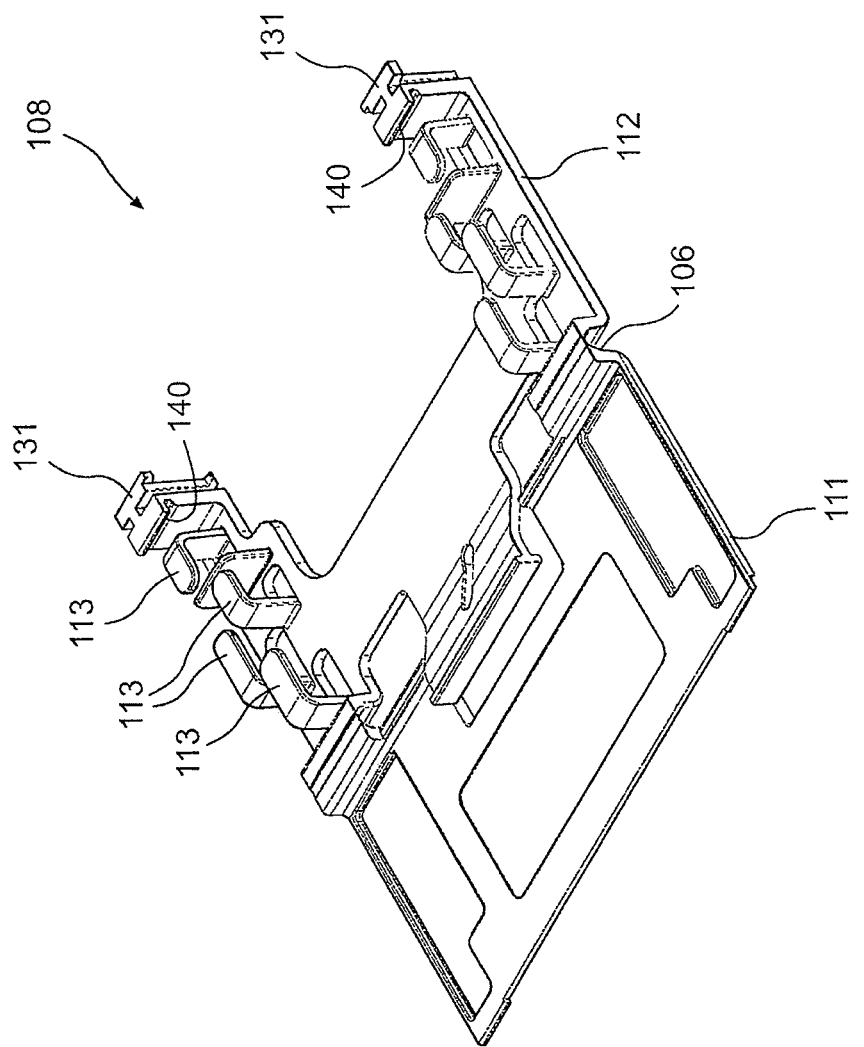

Next, the cable management bracket 108 is described in detailed with reference to FIGS. 2E and 2F. The cable management bracket 108 consists of a cover 111 hinged to a u-Bracket 112 by a living hinge 106. The hinge 106 allows the cover 111 to pivot 180 degrees from the open position (shown in FIGS. 1B and 2F) to a closed position (shown in FIGS. 1A and 2E) where it is retained by snap features 140 located next to the keys 131. At the left and right hand edge of the u-bracket, a plurality of cable retention hooks 113 are arranged in the space between the hinge 106 and the mounting holes creating multiple channels. The cable retention hooks 113 retain cables connected to the adapters 105 in an organized manner and minimize risk of cable damage.

The living hinge 106 on the cable management bracket 108 may be replaced by a Pin Hinge.

Figure 3A:
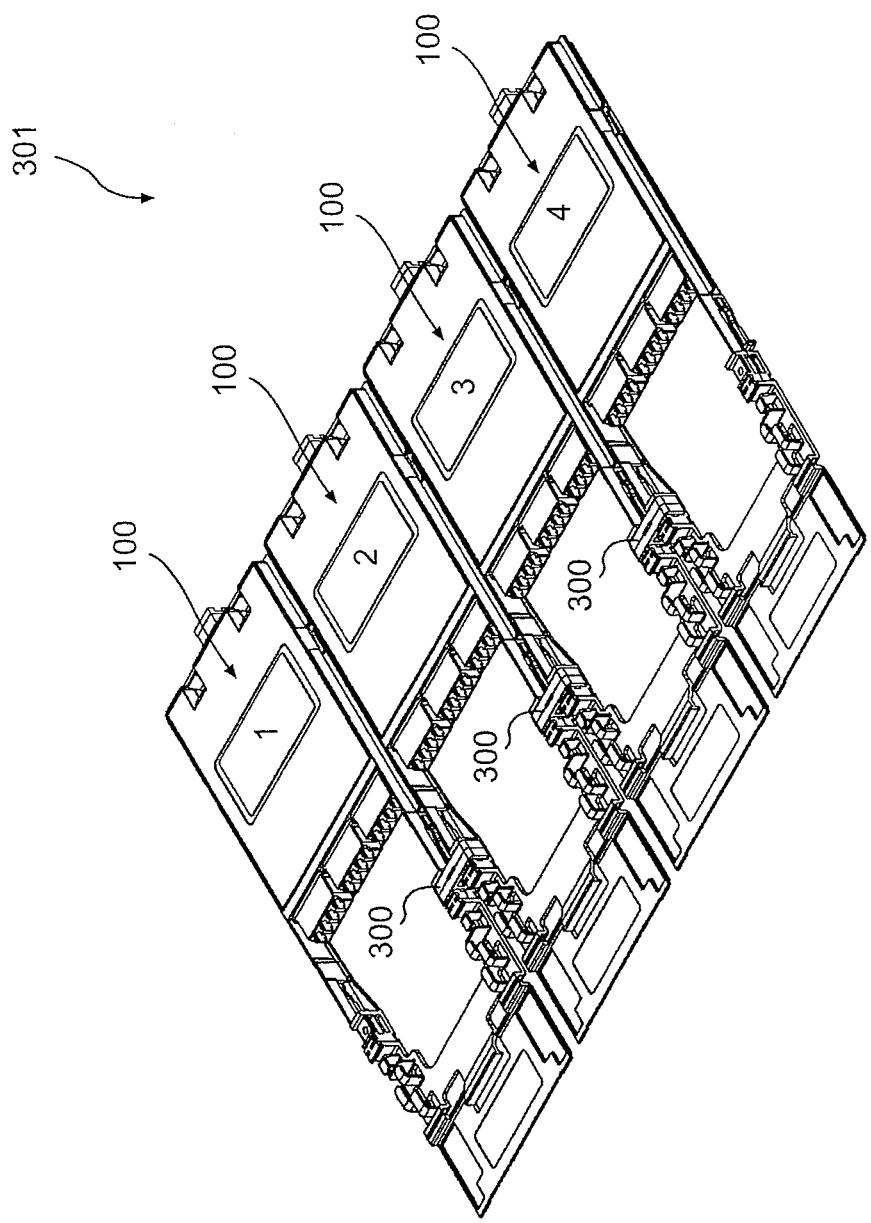
FIG. 3A illustrates an exemplary module tray created by grouping a plurality of optical modules using a module clip.
Figure 3B:
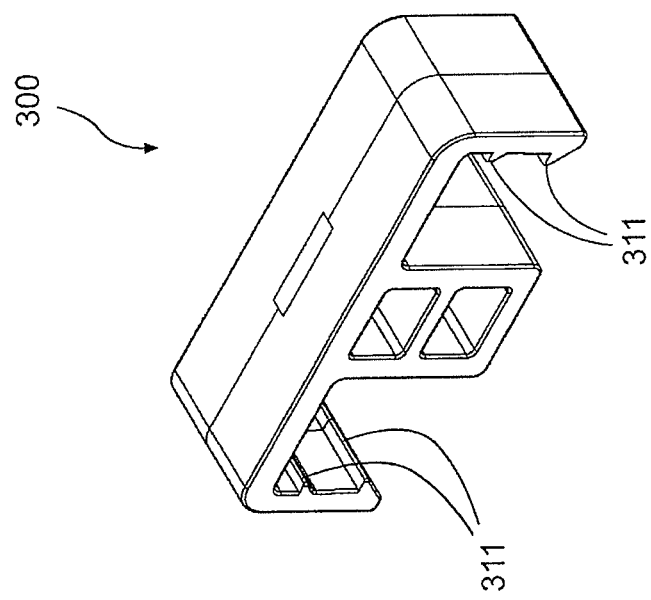
FIG. 3B illustrates the module clip.

FIG. 3A describes how four 12LC Modules (optical module 100) can be connected using a module clip 300 (see FIG. 3B) to form a module tray 301. By using three module clips 300, four optical modules 100 can be mechanical joined, creating a single module tray 301.

Since the module clip 300 can be installed or removed discretely between the optical modules 100, it is possible to configure a group of optical modules as needed by the Network Equipment Space Technician. A common configuration is to group optical modules 1 and 2 with a module clip and group optical modules 3 and 4 with another module clip. The module clip 300 may have projections 311 which lock with the module clip mounting slots 150 provided on the base module 101.

Further, by providing cable retention hooks 113 on the cable management bracket 108, a technician may route all fiber optic patch cords 310 connected to optical modules 1 and 2 to the 1 & 2 side of the panel, and route all fiber optic patch cords 310 connected to Modules 3 and 4 to the 3 & 4 side of the panel.

Figure 3C:
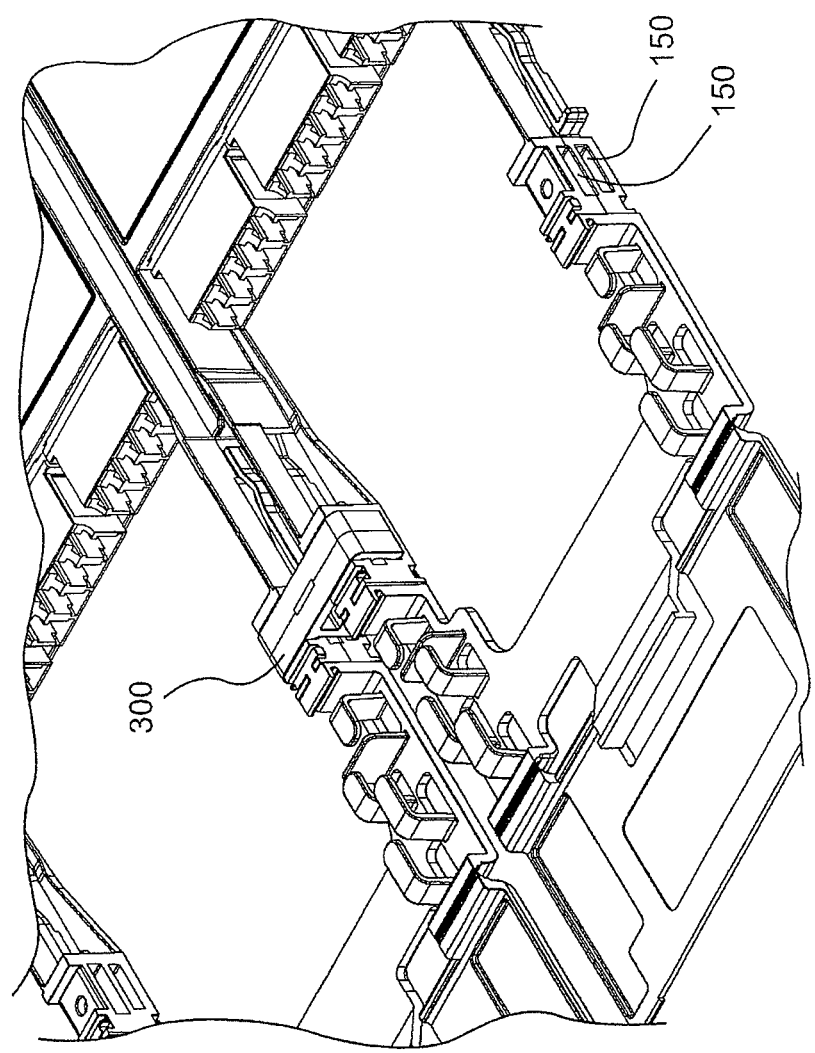
FIG. 3C illustrates an exploded view of a portion of the module tray of FIG. 3A.

FIG. 3C illustrates an exploded partial view of FIG. 3A to show how the module clip 300 groups two optical modules 100 together.

The above-described configuration provides unique fiber management features. Specifically, all fiber optic cables routed to modules installed in the panel are maintained in the same plane as the clipped or grouped modules. This feature makes it much easier for a technician to identify where a particular fiber optic jumper is routed in a panel. Also, when the cover 111 of the cable management bracket 108 is closed, the fiber optic jumpers or patch cords are physically contained in closed channels or lanes.

The above was a description for creating a single module tray 301. Next, a description will be provided for how a high density panel can be created with these trays. At least initially, the discussion will focus on how a 2U panel can be created by stacking six module trays 301.

FIG. 4A illustrates a base 401 on which five module guides 402 are removably mounted. Panel sides 403 are provided on the base and sliding panels 404 are attached to the panel sides 403. As illustrated in FIG. 4B, each of the module guides 402 have rail slots 405 for slidably receiving the rails 103 of the base module 101.

Figure 4C:
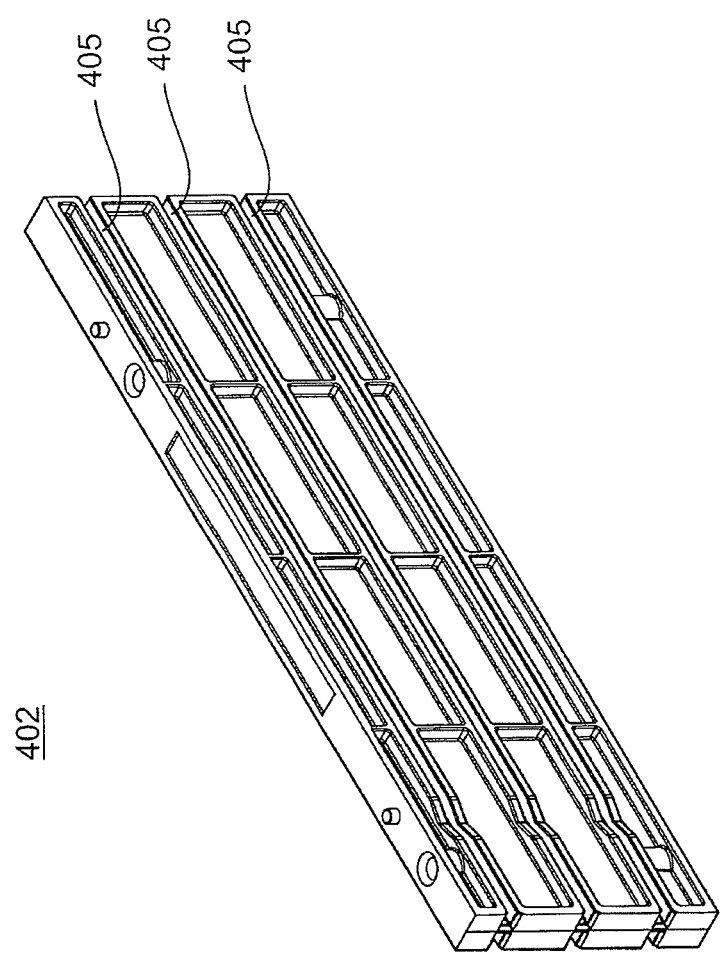

FIG. 4C illustrates a module guide 402 for a 1U panel in which three module trays 301 can be stacked. Accordingly, the 1U panel module guide 402 has three rail slots 405.

FIG. 4D illustrates a partial portion of the module guide 402 to describe the function of stop 121 provided on the side of the base module 101. The stop 121 provides engages with a recess portion 420, which is provided in the rail slot 405 thereby providing a momentary stop when the optical module 100 is pulled out. The stop 121 can be disengaged from the recess portion by applying additional force. By providing the stop 121, we can ensure that the optical module 100 does not slide out from the panel (described in FIG. 5A) easily.

Figure 4E:
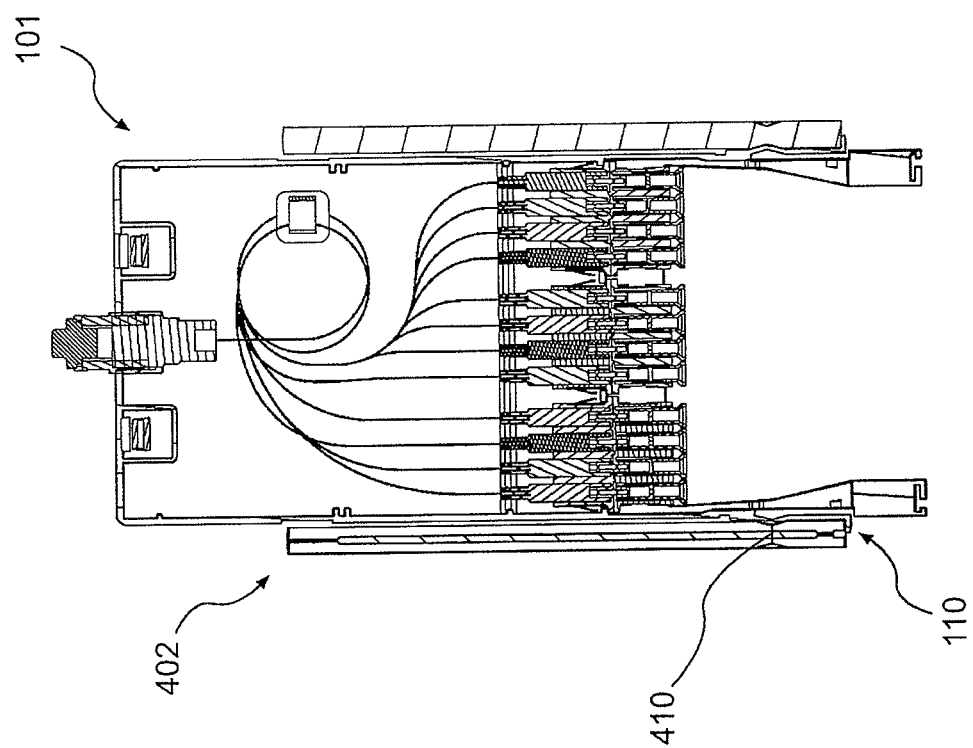
FIGS. 4E and 4F illustrate a travel limiter provided on the base module.
Figure 4F:
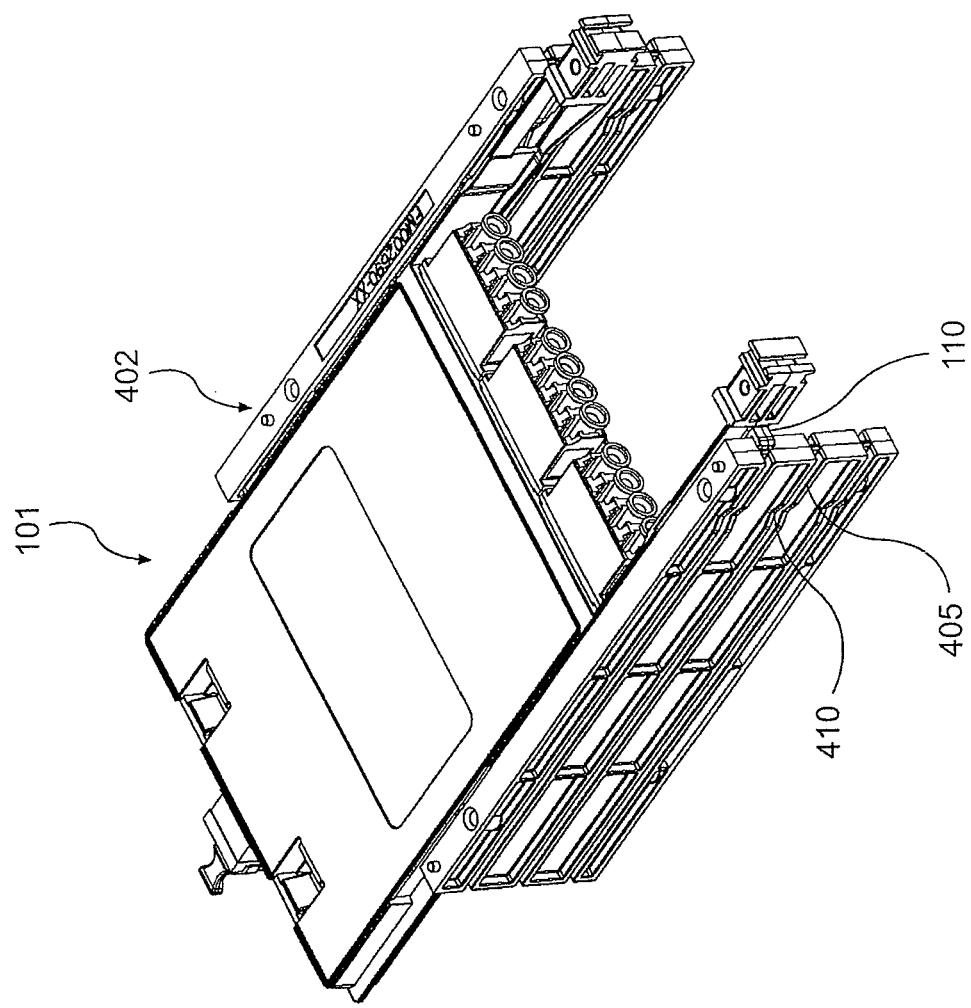

The rail slots 405 have indentations 410 for locking with the male V-section of the travel limiter 110. As described in FIG. 4D, when the base module 101 is pushed inside from the front, the V-portion of the travel limiter 110 engages with the indentation 410 and locks in place. It will be understood that the locking of the travel limiter 110 with the indentation may be overcome by applying sufficient force. As shown in FIGS. 4E and 4F, the L-shaped tab on the travel limiter is stopped by module guide 402 from going further; thereby limiting the inward motion of the optical module. The travel limiter 110 can be pushed inside the slot on the base module 101 (as shown in FIGS. 2C and 2D) to insert the base module 101 (or the optical module 100) from the rear end of the fiber optic panel (described later with reference to FIG. 5A).

Figure 5A:
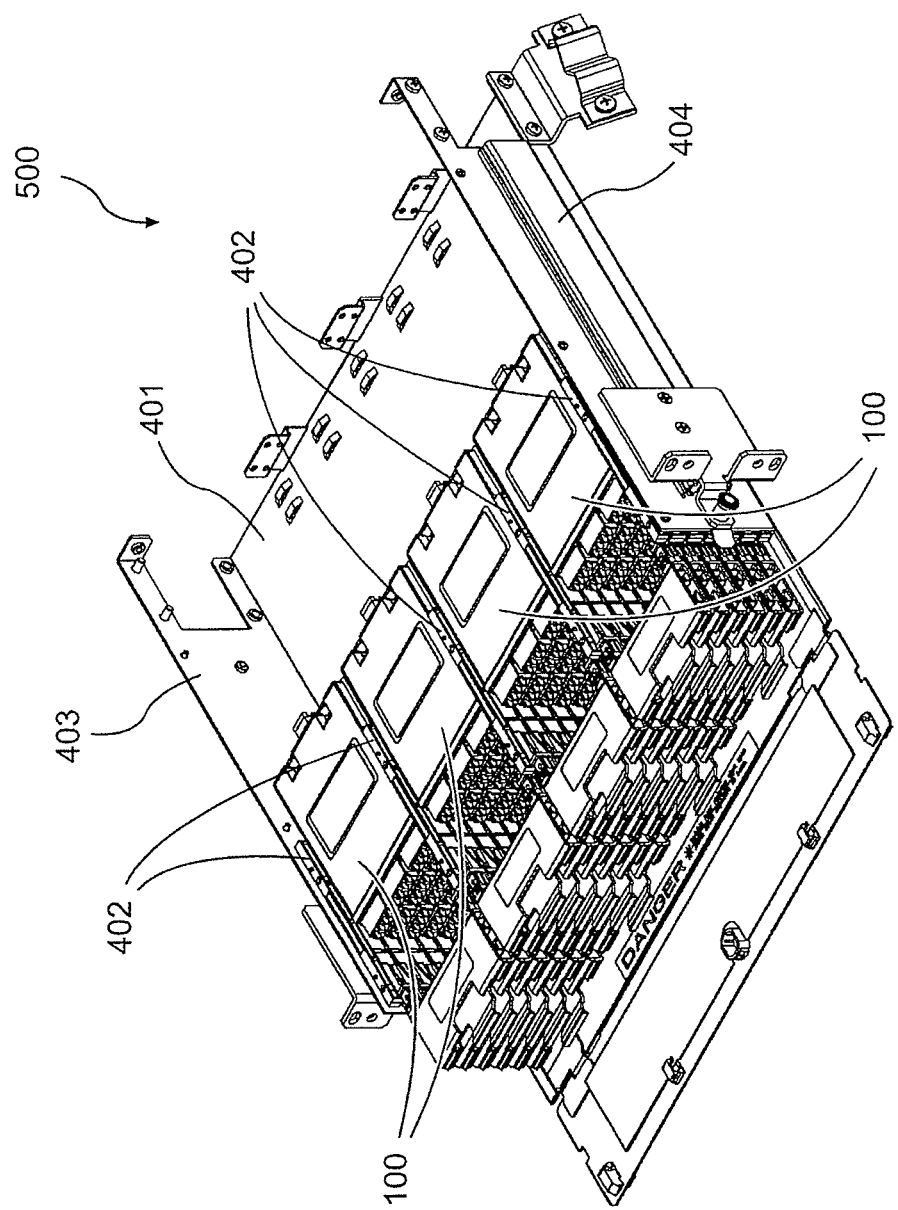
FIG. 5A illustrates an exemplary 2U fiber optic panel.
Figure 5B:
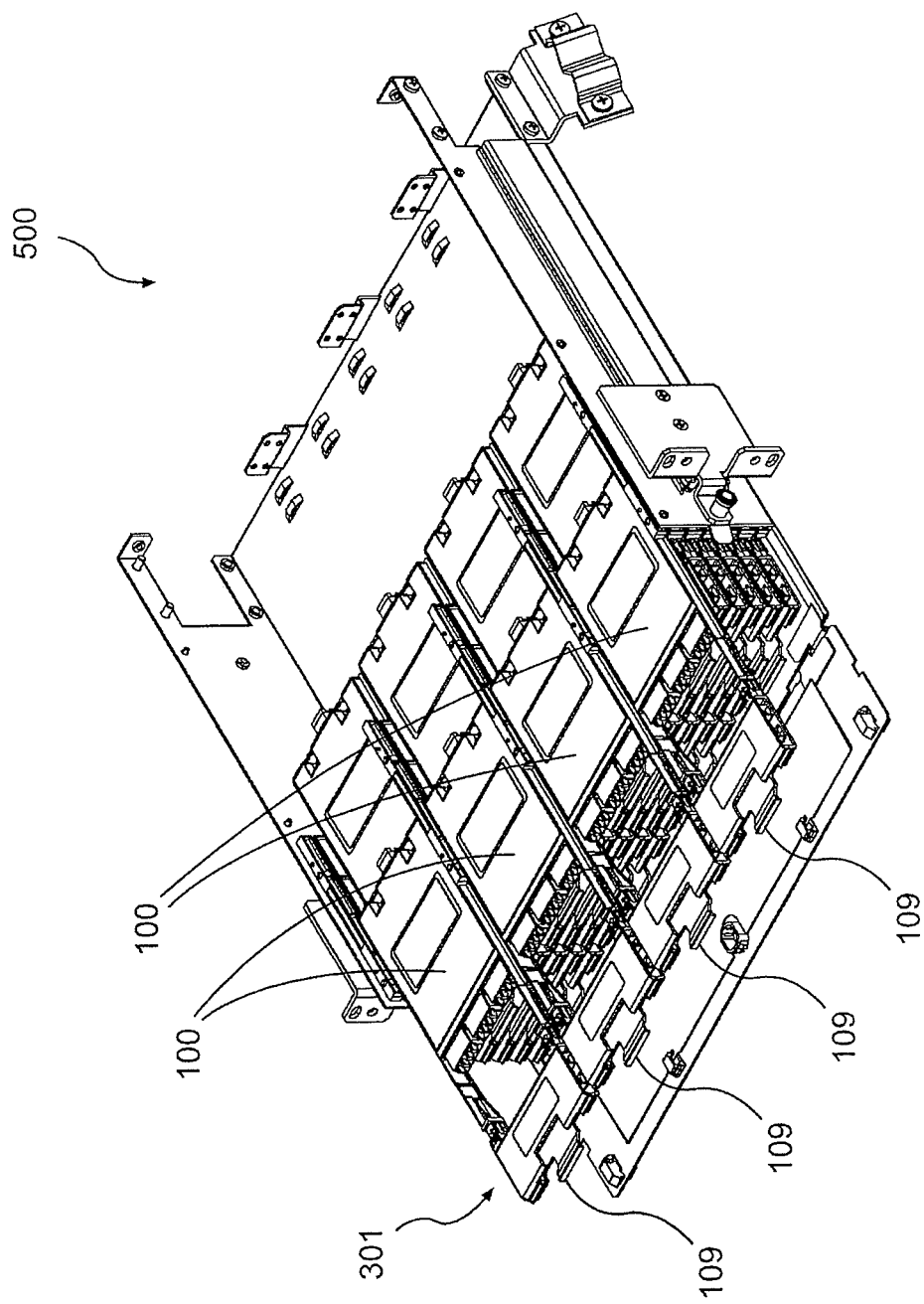
FIG. 5B illustrates the 2U fiber optic panel with one of the trays pulled out.

FIG. 5A illustrates six module trays 301 slid into module guides 402 to create a fiber optic panel 500 whose top cover has been taken off. Specifically, the fiber optic panel 500 of FIG. 5A is a 2U panel. As shown in FIG. 5B, a module tray 301 may be pulled out of a rack using the pull tabs 109, making access to modules and jumpers significantly easier.

Figure 5C:
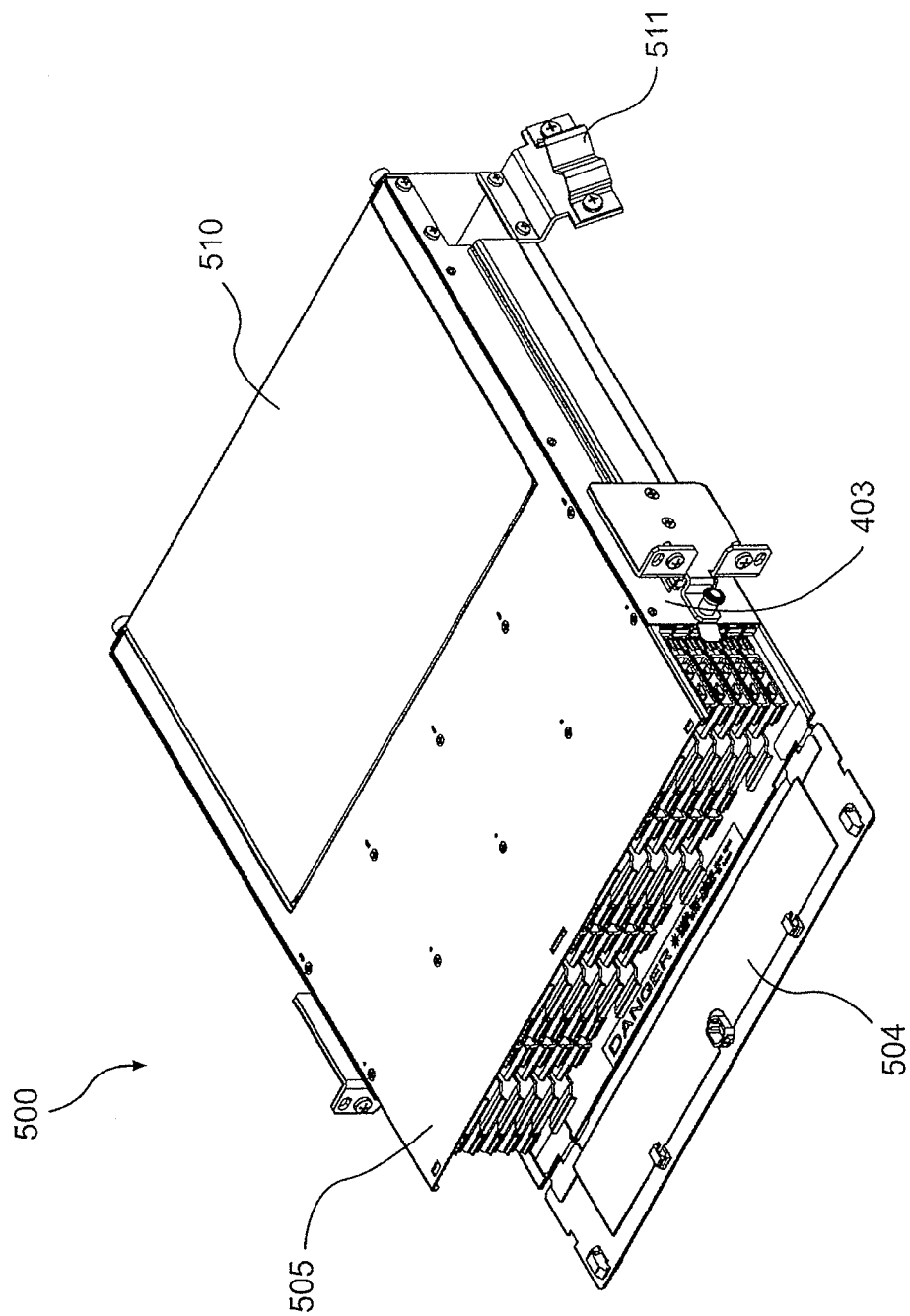
FIG. 5C illustrates the 2U fiber optic panel with a top cover and rear L-door in position.

FIG. 5C illustrates an exemplary embodiment of the fiber optic panel 500 where a cover 505 is placed on the panel sides 403 to cover the module trays 301. Further, a removable rear L-door 510 is also provided along with a cable retention bracket 511. A panel front door 504 is also hingedly mounted to the base 401. Fiber optic cables enter the fiber optic panel 500 through the opening created by the cable retention bracket 511.

Figure 5D:
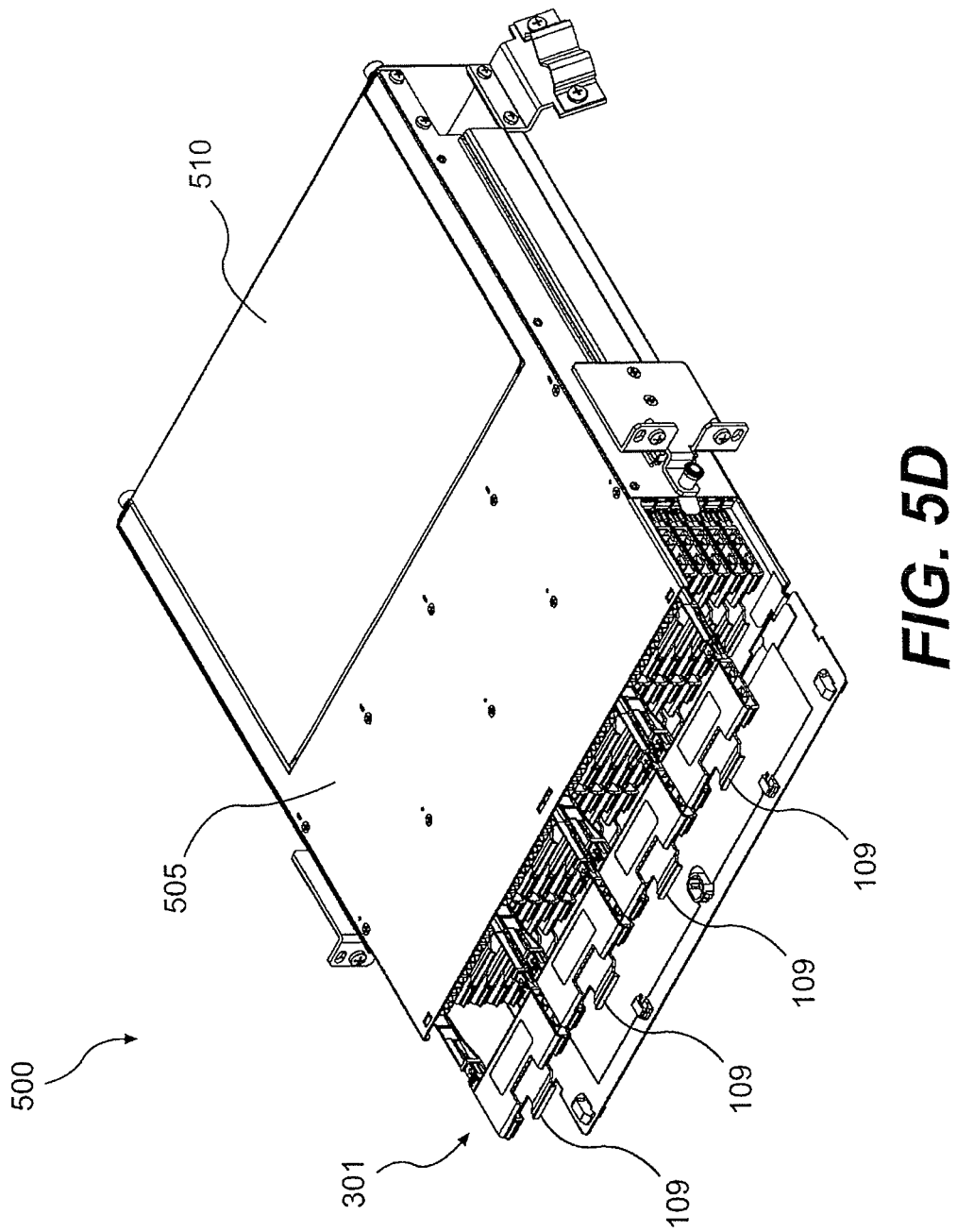
FIG. 5D illustrates the 2U fiber optic panel of FIG. 5C with one of the module trays pulled out.
Figure 5E:
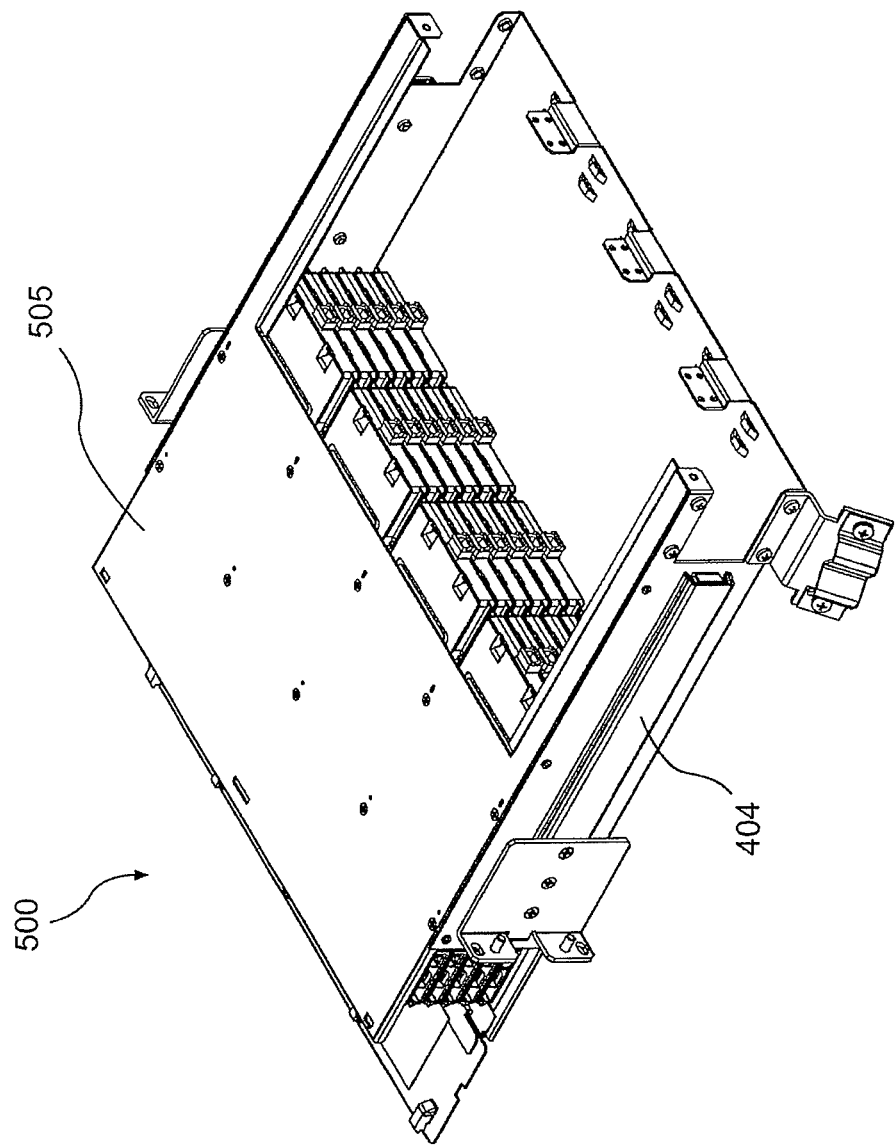
FIG. 5E illustrates the 2U fiber optic panel of FIG. 5C with the rear L-door taken off.

FIG. 5D illustrates a fiber optic panel 500 with one module tray 301 pulled out for maintenance or servicing. FIG. 5E illustrates a fiber optic panel 500 with the rear L-door removed for servicing a rear end of the optical modules 100.

The fiber optic panel 500 described above was a 2U panel with six module trays 301 stacked together. However, the design described above is not limited to a 2U panel.

Figure 6A:
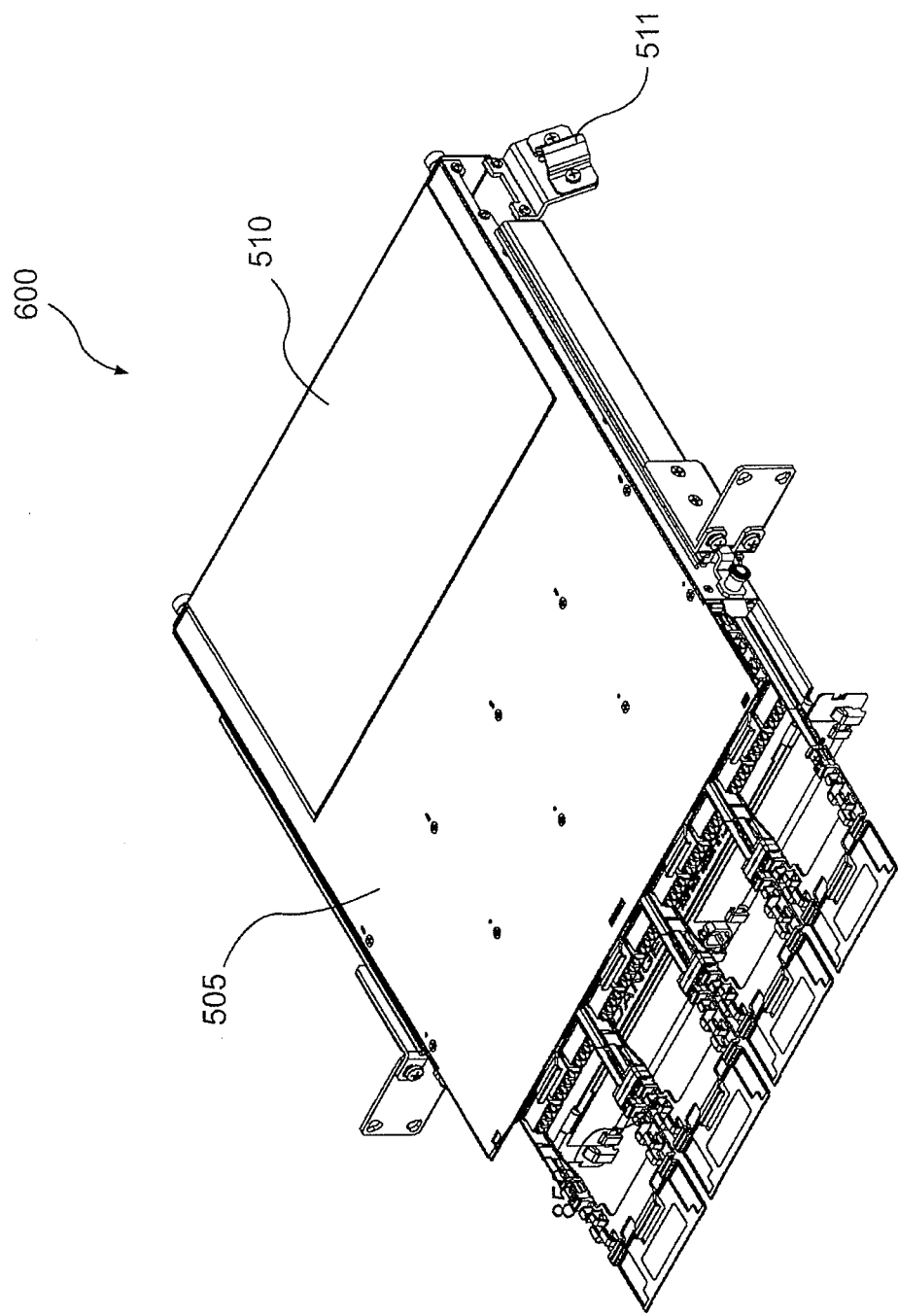
FIG. 6A illustrates an exemplary 1U fiber optic panel.
Figure 6B:
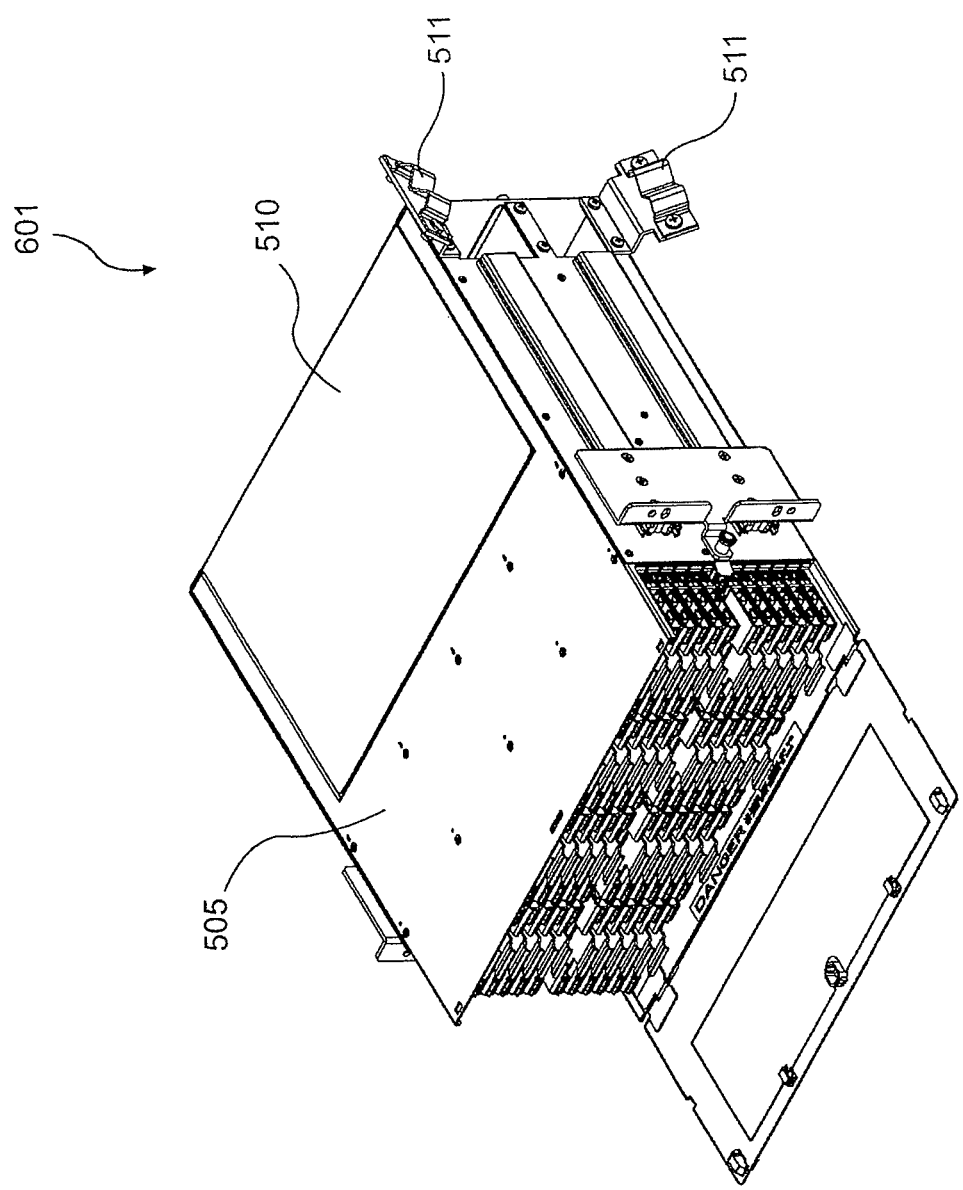
FIG. 6B illustrates an exemplary 4U fiber optic panel.

FIG. 6A illustrates a 1U panel 600 with three module trays 301 and FIG. 6B illustrates a 4U panel 601 with twelve module trays 301. This flexibility is made possible by providing custom size module guides 402 that have custom number of slots 405. As the module guides 402 are removably attached to the base 401, a technician can construct a desired panel size by using the appropriate module guide 402.

Once the fiber optic panels 500, 600, and 601 are created, they can be mounted to a rack 701 to provide a complete fiber management system 700. It should be noted that the above described fiber optic panels 500, 600, and 601 will fit into industry standard 19 inch or 23 inch racks, and are based on industry standard rack unit heights or U's.

Figure 7A:
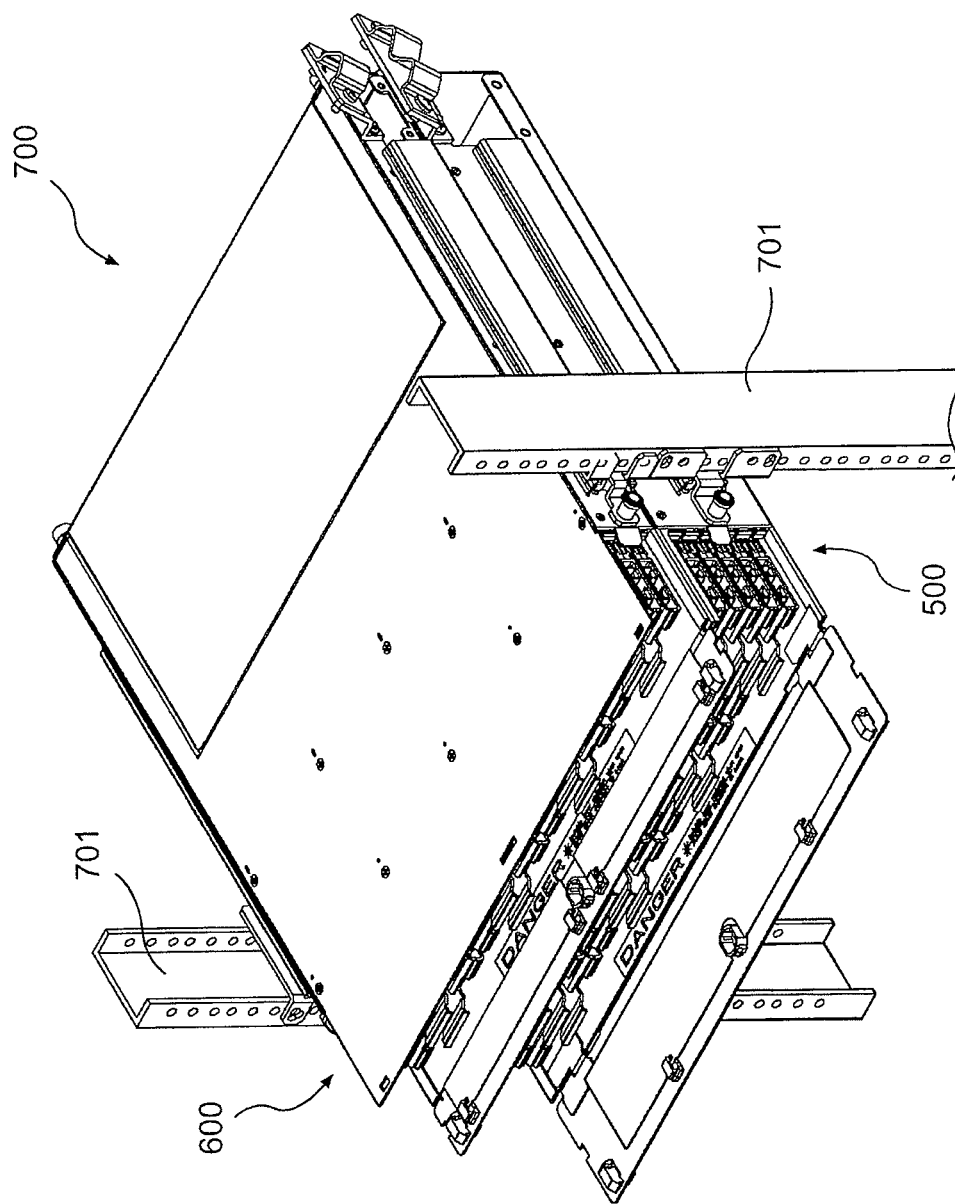
FIG. 7A illustrates an exemplary fiber management system with multiple fiber optic panels mounted on a rack.
Figure 7B:
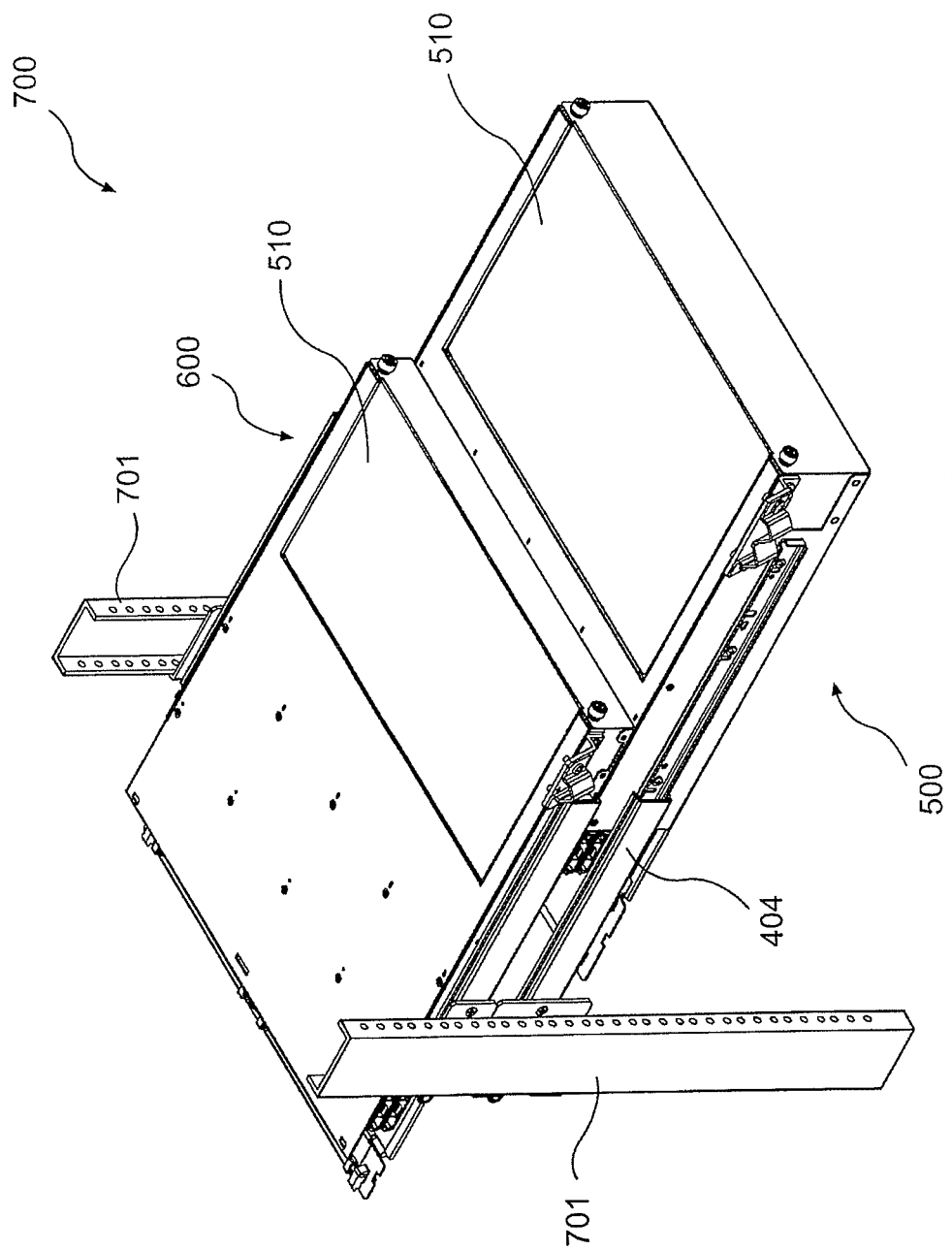
FIG. 7B illustrates the fiber management system of FIG. 7A with one of the panels slid back to a maintenance position.
Figure 7D:
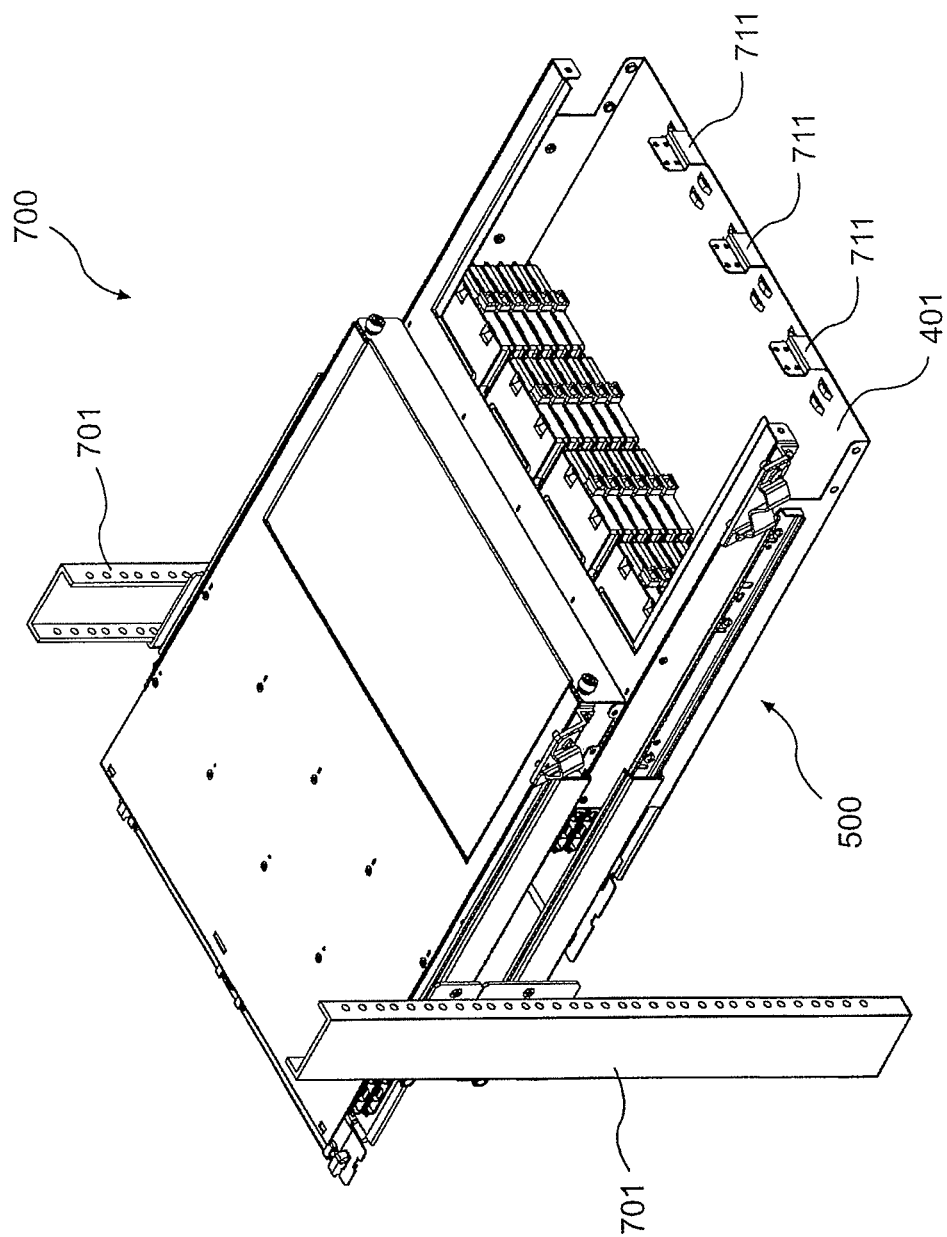
FIG. 7D is another view of FIG. 7C.

FIG. 7A illustrates a fiber management system 700 including a 1U fiber optic panel 600 and a 2U fiber optical panel 500 mounted to a rack 701. FIG. 7B illustrates the 2U panel 500 being pulled back using the sliding panel 404. The purpose of this motion is to allow clear access to the rear interior portion of the pulled back 2U panel by removing the rear L-door 510, as shown in FIG. 7C. This access allows an installer to connect cables easily to modules since the installer has clear visibility and no overhead obstructions. FIG. 7D is another view of the scenario described in FIG. 7C.

The combination of the panel rear L-door 510 and rearward mounting panel slides 404 makes cable installation and servicing easier for the fiber optic installer. For example, the following process can be used.

A fiber optic installer can slide the fiber optic panel rearward and remove the panel rear L-door 510. The installer can attach a fiber optic cable onto the rear section of the fiber optic panel. With no overhead restriction, the fiber optic installer can connect the optic fibers of the fiber optic cable to front mounted bulkheads or modules. Additionally, the fiber optic installer can route fibers easily to splice trays mounted on the rear surface of the panel. After all connections are made, the fiber optic installer can reinstall the panel rear L-door and slide the panel back in place.

During this process, the fiber optic installer needs to access one side of the rack/panel only, and has adequate working room and visibility of the panel interior. The exemplary design described above allows a fiber optic installer to verify that no bend radius limits are violated since the operator has clear access to the panel interior. Further, the design allows easy post installation access without disturbing fiber routing.

Additionally, cable tie tabs 711 may also be provided on the base 401. The cable tie tabs help maintain cable "slack loop" bend; prevent the rear L-door from crushing the fiber cables that enter through the cable retention bracket 511, when the rear L-door 510 door is re-installed (reattached to the fiber optic panel). By providing the cable tie tables, cables can be prevented from being tangled during installation and servicing.

Figure 7E:
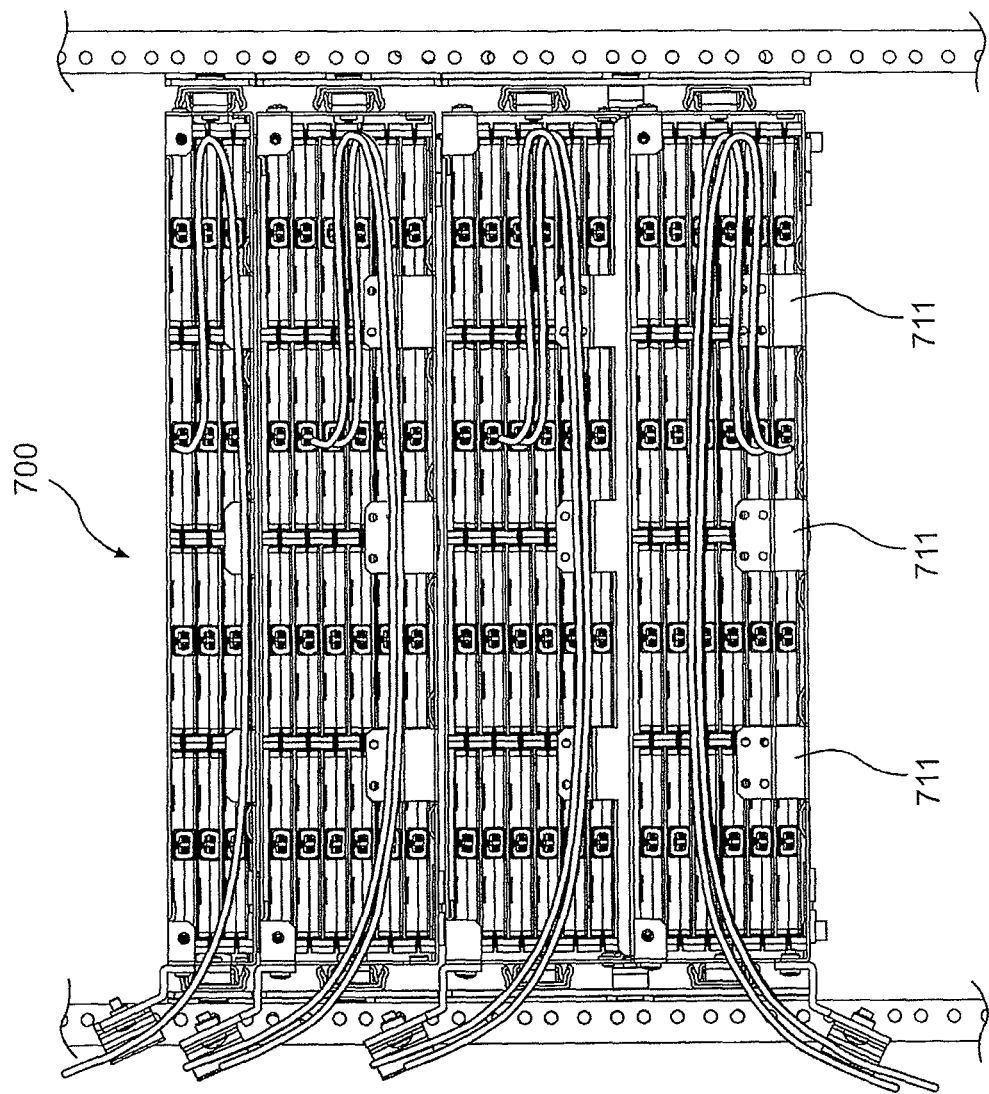
FIG. 7E illustrates a rear view of the fiber management system.

FIG. 7E illustrates a rear view of the fiber management system 700 showing the dense packing of fiber optic cables.

Figure 8A:
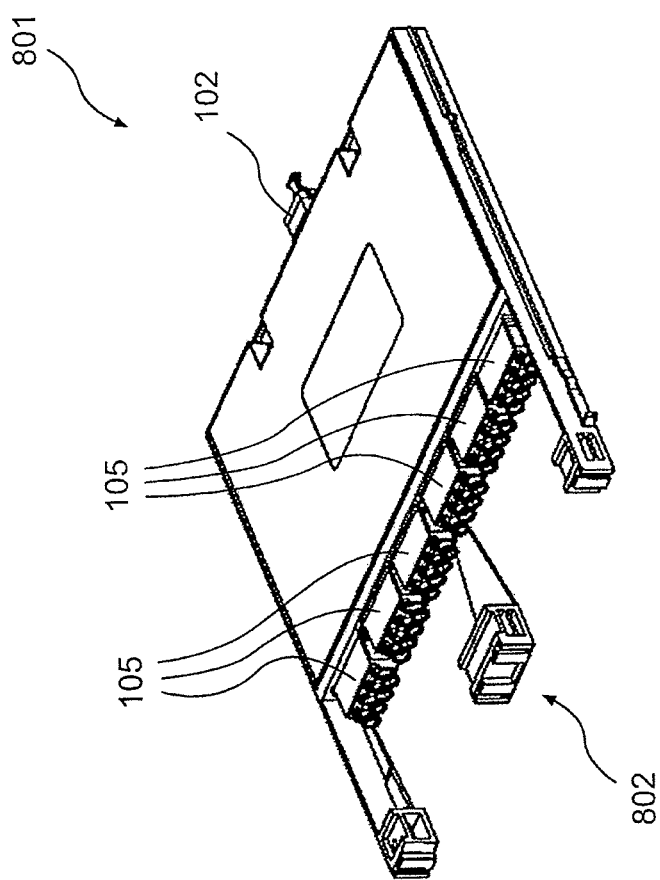
FIG. 8A illustrates an exemplary single-height double-width base module.

According to another exemplary embodiment, a single-height double-width base module 801 is described with reference to FIG. 8A. The base module 801 has twenty four adapters 105 and would be useful in the case where the incoming cable (input to the MTP adapter 102) includes twenty four fibers. The cable does not necessarily need to include twenty four fibers and a cable including less than twenty four fibers can also be input to the MTP adapter 102 of the base module 801. The base module 801 also has a cross bar 802 for mounting two cable management brackets 108. An exemplary embodiment may not have the cross bar 802 and a double wide cable management bracket 108 could be used in place of two normal size cable management brackets. Remaining features of the base module 801 are similar to the base module 101 described in FIG. 2A.

Figure 8B:
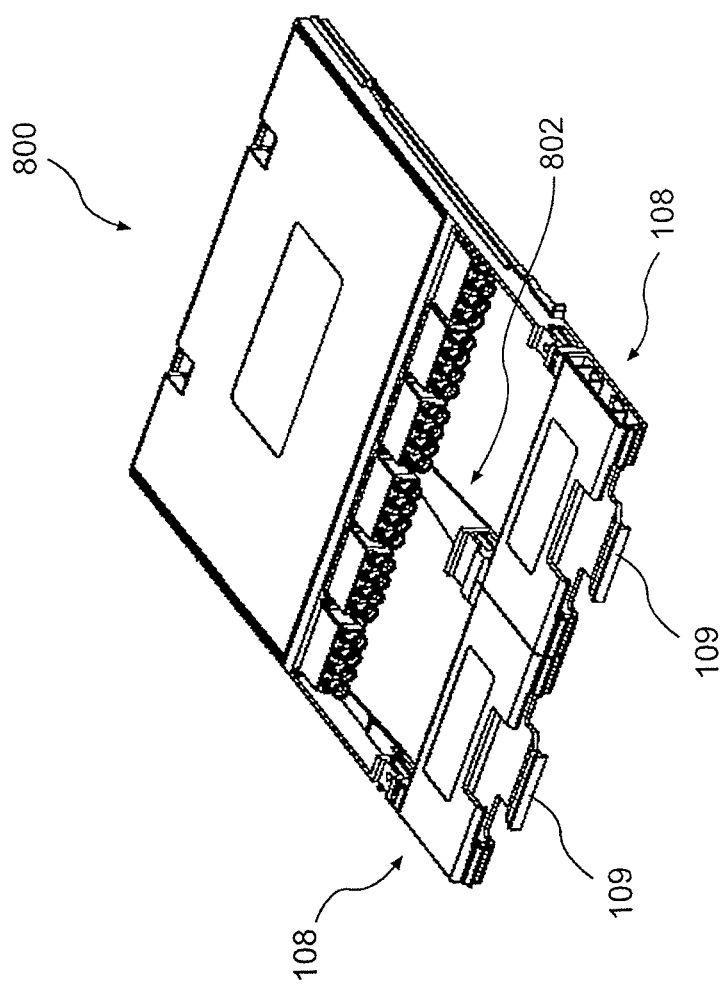
FIG. 8B illustrates an exemplary optical module constructed using the single-height double-width base module of FIG. 8A.

FIG. 8B illustrates an exemplary single-height double-width optical module 800 in which two cable management brackets 108 are mounted to the base module 801. It will be noted that the design described herein can be easily extended to provide a single-height triple width and single-height quadruple-width base module.

Figure 8C:
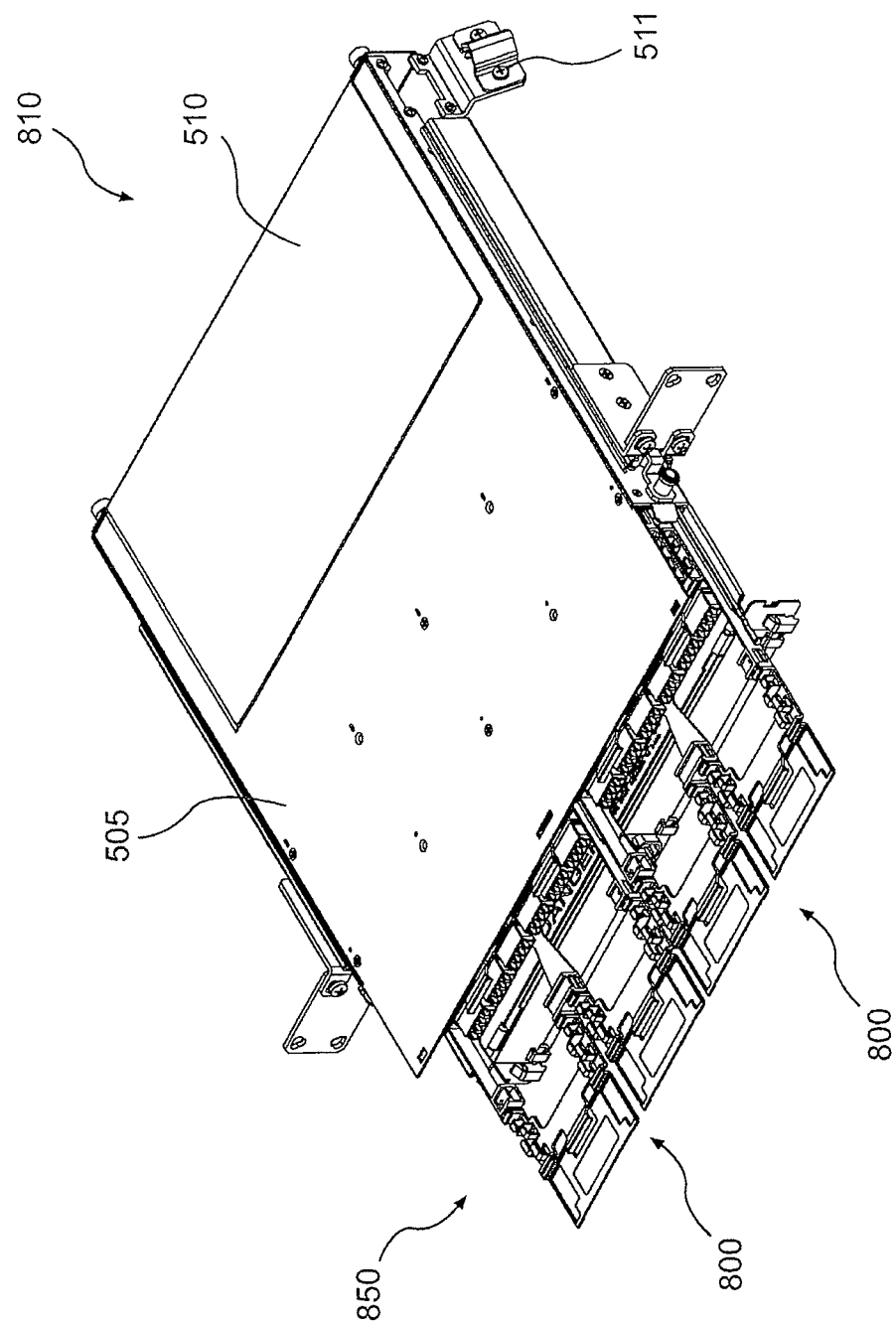
FIGS. 8C and 8D illustrate an exemplary fiber optic panel constructed using the optical module of FIG. 8B.

FIG. 8C illustrates a 1U panel 810 with two base modules 800 forming a single tray 850 with the tray 850 pulled out. A total of three trays 850 form the 1U panel 810. In FIG. 8C, the two base modules 800 are not clipped or grouped together with a module clip and can move in and out of the panel 810 independently. Remaining features of the 1U panel 810 are similar to the 1U panel described earlier.

Figure 8D:
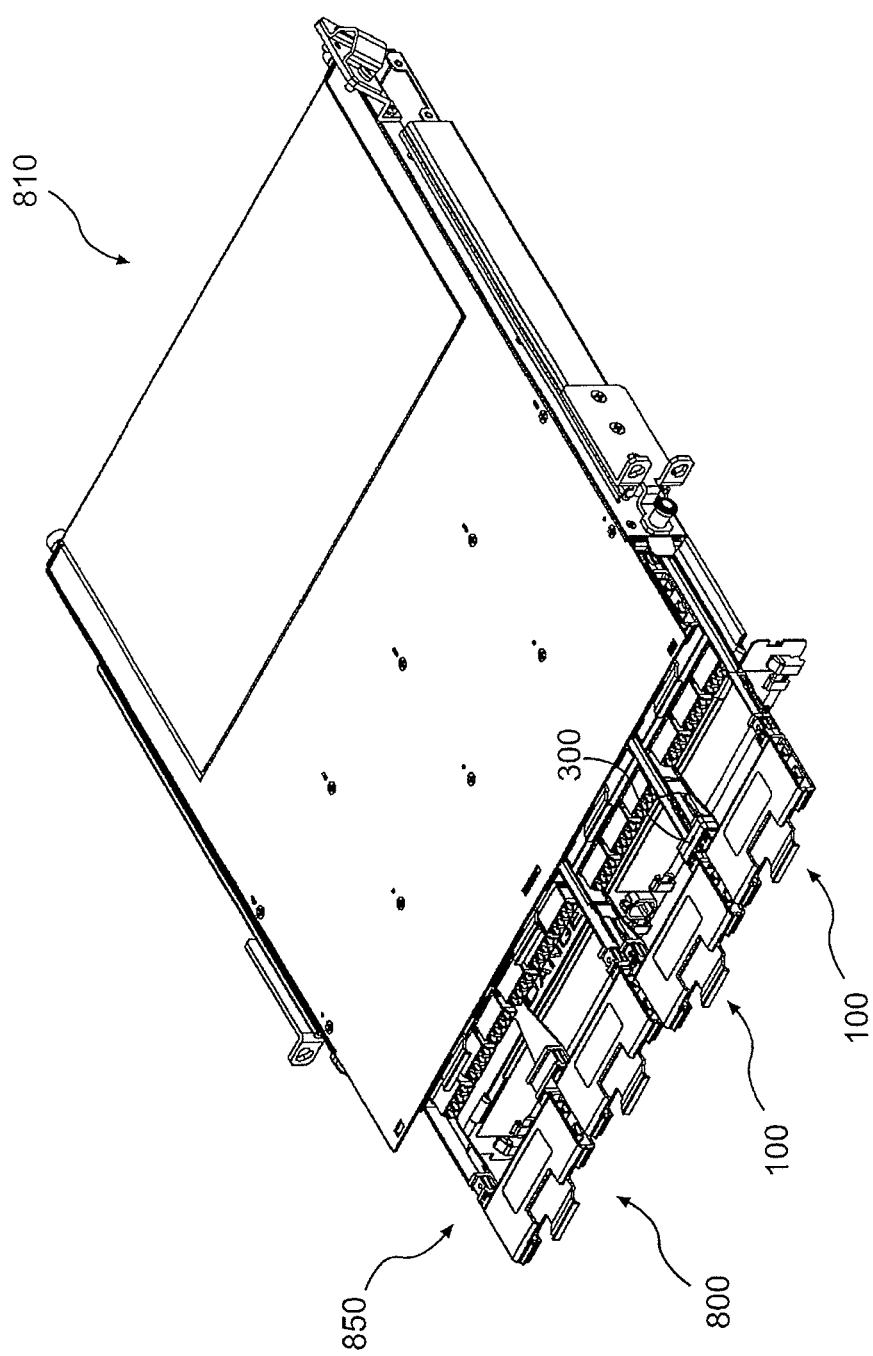

FIG. 8D illustrates another exemplary embodiment of the 1U panel 810 in which a single tray is formed from a double-width optical module 801 and two single-width optical modules 101. The single-width modules 101 are coupled using a module clip 300. FIG. 8D demonstrates the flexibility of the design described above as a single tray can be configured with different sized modules. It will be obvious to one skilled in the art that the number of module guides 402 in a single panel will be changed according to whether a double-width or a single-width optical module is used.

Figure 8E:
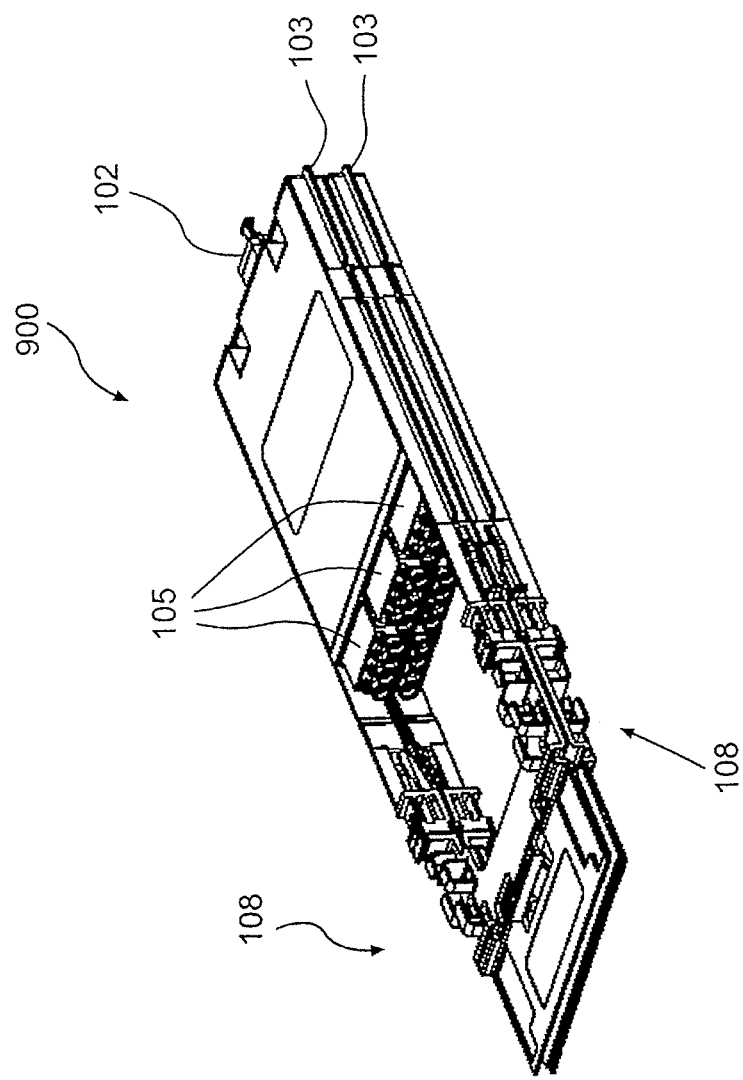
FIG. 8E illustrates an exemplary optical module constructed using a single-width double-height base module.

FIG. 8E illustrates an exemplary single-width double-height optical module 900 with twenty four adapters 105. The module 900 is exemplarily provided with two module rails 103 and two cable management brackets 108. In FIG. 8E, one of the cable management brackets 108 is mounted in an inverted manner, which is made possible by providing the bi-directional key way design described earlier. It will be noted that the design described herein can be easily extended to provide single-width triple-height, double-width double-height, and double-height quadruple-width base modules.

The exemplary designs described above have at least the following additional advantages.

(1) Improved cable management on the front side of the fiber optic panels: Optical modules 100 are combined into module trays 301. Jumpers are maintained in the same plane as the module trays so that the module trays can be slid out of panels without interfering with other module trays. This feature limits optical traffic disruption. The cable management racket mounted to the base module "groups" cables in bundles to facilitate easier identification and efficient routing.

(2) Module tray size can be varied since module clips 300 can be added or removed by installers. This feature allows application customization.

(3) Improved cable management to modules in rear of panel. Panels slide rearward and rear L-door can be removed to allow visible access to rear of modules. Tie down tabs allow management and routing of cables to from left or right side of the fiber optic panel.

(4) Cable management bracket 108 can be field installed in two orientations relative to the module cover 107. This feature is key for MT polarity conventions. This feature allows modules to be "repurposed" after initial installation.

(5) Module trays 301 and module guides 402 have guides and stops which provide the following features and benefits. The optical modules can not be pushed backwards without actuating a release. This ensures forces needed to install connectors will not cause the optical module 100 to slide backwards in rails guides. Further, the optical modules 100 can be installed from panel front or rear allowing easy installation and servicing. Also, the optical modules 100 and module guides 402 have discrete restive stops to allow operators to position module trays in correct positions (Operation, Servicing, and Maintenance).

(6) Module guides 402 can be removed easily to allow panels to be field configured. This feature allows a fiber optic panel to contain a plurality of module sizes (single height/single width, double height/single width, and single height/double width). This features allows application customization by installers. Panels may be revised in future, minimizing the upgrade cost.

(7) Panel design is low cost due to modular construction.

(8) Fiber optic panel and optical module structure support several common applications—cross-connect and patch panel functions, splitter function, WDM/CWDM/DWDM functions.

Furthermore, the exemplary designs described above have a number of advantages over the related art publications noted in the background section. The description of the advantages listed below is based on Applicant's best understanding of the related art publications.

(1) The exemplary optical modules described herein can be of varying heights and width. However, the modules described in the related art publications can be of varying width but only one height.

(2) In the exemplary designs described above, module trays can be formed using two, three, or four optical modules by grouping the desired number of optical modules. That is, depending on how the optical modules are clipped together, there can be up to four individual, discretely movable optical modules in one plane. If two optical modules are grouped together and the remaining two modules are not grouped using the module clips, then we have three different groups that can move in and out of the panel independently. However, in the related art publications sliding trays are installed on rails in the interior of the module and the Modules are installed on top of the sliding trays. Therefore, all the modules in the same plane move together.

Other advantages of the exemplary designs described herein over the related art publications will be apparent to one of ordinary skill in the art.

The foregoing exemplary embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An optical module comprising:
    a base module; and
    a cable management bracket removably attached to the base module, wherein:
    the base module includes:
    a first adapter configured to interface with a first cable;
    a plurality of second adapters configured to interface with a plurality of optical fibers and a plurality of second cables, and the cable management bracket includes a plurality of cable routing slots for routing the plurality of second cables, wherein adjacent optical modules are removably coupled by using a module clip.

2. The optical module of claim 1, wherein the plurality of cable routing slots are created by dividers disposed in a substantially straight line on opposite sides of the optical module.

3. The optical module of claim 1, further including module guide rails on opposite sides thereof.

4. The optical module of claim 2, wherein:

the cable management bracket includes a bracket, a cover hingedly mounted to the bracket, and the dividers, and the dividers are provided on the bracket such that the cover snaps to the bracket in its closed position and covers the dividers when viewed from above.

5. The optical module of claim 4, wherein a living hinge is hingedly mounts the cover to the bracket.

6. The optical module of claim 1, further including a module travel limiter disposed on at least one side thereof where the module guide rails are provided.

7. The optical module of claim 1, further including a module location guide disposed on at least one side thereof where the module guide rails are provided.

8. The optical module of claim 2, wherein the dividers are L-shaped.

9. The optical module of claim 1, wherein the cable management bracket is removably attached to the base module in two opposite orientations relative to the base module.

10. The optical module of claim 1, wherein the base module further includes a module cover for covering the plurality of optical fibers and at least a partial area of the module cover is transparent when viewed from above.

11. An optical module tray including a plurality of optical modules according to claim 1, wherein each of the plurality of optical modules are removably coupled with adjacent optical modules.

12. A fiber optic panel including:

a base;

a plurality of module guides removably attached to the base; and a plurality of the optical modules claimed in claim 1 slid between the module guides.

13. The fiber optic panel of claim 12 further comprising sliding panels attached to opposite sides thereof for allowing the fiber optic panel to slide in a rearward direction.

14. A fiber management system including:

a rack; and the fiber optic panel of claim 12 mounted on the rack.

15. The optical module of claim 1, wherein the module clip is removably attached to a lateral side of the optical module.

16. The optical module of claim 1, wherein the base module further comprises clip mounting slots on opposite sides of the base module.

* * * * *